US008207289B2

(12) United States Patent
Jernigan

(10) Patent No.: US 8,207,289 B2
(45) Date of Patent: Jun. 26, 2012

(54) HIGH MOLECULAR WEIGHT POLYESTER POLYMERS WITH REDUCED ACETALDEHYDE

(75) Inventor: Mary Therese Jernigan, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 632 days.

(21) Appl. No.: 11/805,292

(22) Filed: May 23, 2007

(65) Prior Publication Data

US 2008/0293912 A1 Nov. 27, 2008

(51) Int. Cl.
*C08G 63/00* (2006.01)
*C08F 6/00* (2006.01)

(52) U.S. Cl. ........ 528/279; 528/274; 528/286; 528/302; 528/305; 528/308.1; 528/480; 528/481; 524/147; 524/153

(58) Field of Classification Search .................. 528/274, 528/279, 286, 302, 305, 308.1; 524/147, 524/153
See application file for complete search history.

(56) References Cited

U.S. PATENT DOCUMENTS

| 4,093,593 A | 6/1978 | Go |
| 4,161,571 A | 7/1979 | Yasui et al. |
| 4,330,661 A | 5/1982 | Go |
| 4,357,461 A | 11/1982 | Go et al. |
| 4,424,337 A | 1/1984 | Smith et al. |
| 4,447,595 A | 5/1984 | Smith et al. |
| 4,617,374 A | 10/1986 | Pruett et al. |
| 4,764,323 A | 8/1988 | Al Ghatta |
| 4,837,115 A | 6/1989 | Igarashi et al. |
| 5,017,680 A * | 5/1991 | Sublett ........................... 528/274 |
| 5,021,515 A | 6/1991 | Cochran et al. |
| 5,049,647 A | 9/1991 | Al-Ghatta |
| 5,090,134 A | 2/1992 | Russemeyer et al. |
| 5,104,965 A | 4/1992 | Jenkins et al. |
| 5,144,570 A | 9/1992 | Maher, III |
| 5,250,333 A | 10/1993 | McNeely et al. |
| 5,258,233 A | 11/1993 | Mills et al. |
| 5,266,413 A | 11/1993 | Mills et al. |
| 5,372,864 A | 12/1994 | Weaver et al. |
| 5,384,377 A | 1/1995 | Weaver et al. |
| 5,410,984 A | 5/1995 | Pikus et al. |
| 5,650,469 A | 7/1997 | Long et al. |
| 5,656,716 A | 8/1997 | Schmidt et al. |
| 5,898,058 A | 4/1999 | Nichols et al. |
| 6,066,714 A | 5/2000 | Putzig et al. |
| 6,166,170 A | 12/2000 | Putzig |
| 6,197,851 B1 | 3/2001 | Maxwell et al. |
| 6,214,915 B1 | 4/2001 | Avakian et al. |
| 6,274,212 B1 | 8/2001 | Rule et al. |
| 6,384,180 B1 * | 5/2002 | Jernigan et al. ............... 528/285 |
| 6,498,212 B1 | 12/2002 | Kao et al. |
| 6,500,915 B1 | 12/2002 | Fujimori et al. |
| 6,559,271 B2 | 5/2003 | Schaaf et al. |
| 2002/0032300 A1 | 3/2002 | Dowling et al. |
| 2002/0094402 A1 | 7/2002 | Jen |
| 2002/0128427 A1 | 9/2002 | Schaaf et al. |
| 2002/0136808 A1 | 9/2002 | Rule |
| 2002/0193555 A1 | 12/2002 | Hori et al. |
| 2002/0198297 A1 | 12/2002 | Odorisio et al. |
| 2003/0018160 A1 | 1/2003 | Otto et al. |
| 2006/0047103 A1 | 3/2006 | Armentrout et al. |
| 2006/0148957 A1 | 7/2006 | Stewart et al. |
| 2006/0180790 A1 | 8/2006 | Deshpande et al. |
| 2007/0066794 A1 | 3/2007 | Jernigan |

FOREIGN PATENT DOCUMENTS

| EP | 1 188 783 A2 | 3/2002 |
| EP | 1 239 006 A1 | 11/2002 |
| JP | 48-79896 A | 10/1973 |
| WO | WO 97/44376 | 11/1997 |
| WO | WO 02/18472 A2 | 3/2002 |
| WO | WO 02/068497 A1 | 9/2002 |
| WO | WO 02/079310 A2 | 10/2002 |
| WO | WO 2006/138406 A2 | 12/2006 |

OTHER PUBLICATIONS

Pigment Handbook, vol. 1, copyright 1973, John Wiley & Sons, Inc. pp. 323-349.
Fred W. Billmeyer, Jr., *J. Polymer Science*, 4, (1949) pp. 83-86.
Fred W. Billmeyer, Jr., *Principles of Color Technology*, John Wiley & Sons, (1981), pp. 25-66.
Japan Application Showa 62-182065 (1987).
Notification of Transmittal of the International Search Report and the Written Opinion of the International Searching Authority, or the Declaration date of mailing Sep. 1, 2008 on corresponding International Application No. PCT/US2008/006163.
Office Action issued Dec. 12, 2011 in China Application No. 200880017127.7 (English Translation).

* cited by examiner

*Primary Examiner* — James J Seidleck
*Assistant Examiner* — Gennadiy Mesh
(74) *Attorney, Agent, or Firm* — Oblon, Spivak, McClelland, Maier & Neustadt, L.L.P.

(57) ABSTRACT

Polyester compositions, especially polyethylene terephthalate homopolymer and copolymers, are disclosed containing titanium catalysts and catalyst deactivator added late in the manufacturing processing having reduced acetaldehyde generation rates. The polyester compositions are low in free acetaldehyde, making them suitable for fabrication into beverage containers for relatively tasteless beverages such as bottle water. Furthermore, the polyesters are polymerized to a high inherent viscosity in reduced processing time, without the necessity of further polymerization in the solid state, and in the absence of acetaldehyde scavengers leading to polyester polymers having reduced color.

4 Claims, No Drawings

HIGH MOLECULAR WEIGHT POLYESTER POLYMERS WITH REDUCED ACETALDEHYDE

1. FIELD OF THE INVENTION

The present invention pertains to high intrinsic viscosity polyester polymers polycondensed in the melt phase using titanium catalyst, having low free acetaldehyde ("AA"), and exhibiting low acetaldehyde generation rates.

2. BACKGROUND ART

Polyethylene terephthalate ("PET") is used extensively in packaging applications, in particular as beverage containers. In these applications, it is important that the PET have a relatively high molecular weight, generally expressed as inherent viscosity ("Ih.V.") or intrinsic viscosity ("It.V."), and low amounts of acetaldehyde (AA). Acetaldehyde has a noticeable taste and can be detected by human taste buds at low levels. When preforms are blown into bottles, unacceptably high AA levels adversely impact the taste of the beverage contained in said bottles.

The conventional PET production process begins with esterification of predominantly terephthalic acid and ethylene glycol, or ester exchange of predominantly dimethyl terephthalate and ethylene glycol. The esterification need not be catalyzed. Typical ester exchange catalysts, which may be used separately or in combination, include titanium alkoxides, tin (II) or (IV) esters, zinc, manganese or magnesium acetates or benzoates and/or other such catalyst materials that are well known to those skilled in the art. The resulting mixture is then subjected to polycondensation in the melt at elevated temperature, for example 285° C., in the presence of a suitable catalyst. Compounds of Sn, Sb, Ge, Ti, or others have been used as polycondensation catalysts.

Following melt phase polycondensation, which generally achieves an inherent viscosity in the range of 0.5 to 0.65, the polyester is extruded, cooled, and cut into granules, which are then subjected to a crystallization process wherein at least the exterior of the granules becomes crystalline. This crystallinity is necessary to prevent sintering and agglomeration in a subsequent solid state polymerization. Crystallization and annealing take place in a fluidized bed at temperatures of, for example 160-220° C., for several hours, as discussed by WO 02/18472 A2, and U.S. Pat. Nos. 4,161,571; 5,090,134; 5,114,570; and 5,410,984.

Solid state polymerization or "solid stating" is performed to increase the intrinsic viscosity of the polymer in the solid state. Volatiles such as acetaldehyde are removed in vacuo or by a flow of inert gas (e.g., nitrogen) in solid state polymerization operations.

Solid stating has the advantage that relatively high inherent viscosities can be achieved. It has the further advantage that free acetaldehyde content of the polymer is lowered substantially by the removal of free acetaldehyde by volatilization. Solid stating has the considerable disadvantages of high energy usage and long manufacturing time. Finally, solid state polymerization causes the pellets to develop shell-to-core molecular weight gradients, which results in a loss in inherent viscosity during the molding of articles; the loss in Ih.V. is theorized to be due to re-equilibration in the melt.

JP 4879896 disclosed a method for producing polyester wherein bis-($\beta^2$-hydroxyethyl)terephthalate or a mixture of bis-($\beta^2$-hydroxyethyl)terephthalate and at least one other bifunctional compound is polycondensed in the presence of a titanium compound catalyst to produce a polyester with a high degree of polymerization so that at least 85% of the repeating structural units of the polyester are ethylene terephthalate units, and wherein a phosphorus compound is added to the molten polyester once the polycondensation reaction has been completed.

It would be desirable to eliminate solid stating, but to do so would require more extended melt-phase polycondensation, that is, longer times at temperatures above the melting point of the polyester. With all other parameters being equal, the amount of free AA generated in the melt phase manufacture and the number of AA precursors made in the melt phase manufacture increase dramatically as the It.V. (or molecular weight) of the polymer increases. Furthermore, as the It.V. increases it becomes more difficult to remove the free AA from the higher viscosity melt. Molecular weight build-up in the melt has until recently typically been limited to a reasonably low number (e.g., It.V. of about 0.65 dL/g or less, more usually between 0.55 and 0.60 dL/g or less), followed by further advancing the molecular weight of the polymer in the solid state.

There are several causes for the formation of free AA and AA precursors; the AA precursors which contribute to additional AA generated upon melting the solid polyester particles in subsequent melt processing such as during injection molding of bottle preforms. One contributor to the formation of free AA and AA precursors during melt phase polymerization is the thermal degradation of the polyester polymers in the melt phase which becomes more prevalent as the It.V. of the polymer is increased at high temperatures. When solid-state polymerization is not used to increase the molecular weight, a longer melt-phase residence time may be necessary to produce the molecular weight needed to later mold acceptable preforms, which can be blown subsequently into bottles having the required properties for a given application. This extended melt-phase exposure increases the extent of thermal degradation; therefore, producing PET exclusively in the melt phase with acceptable free AA and/or acceptable AA generation rate during subsequent molding is much more challenging than the conventional scenario where a portion of the molecular build-up occurs in a solid-phase process. Along with a shorter melt-phase step which generates less free AA and fewer AA precursors, conventional processes have the added advantage of the solid-stating gas sweeping away most of the free AA (also described herein as "residual AA") contained on or in the solid polyester particles.

Another contributor is inadequately stabilized and/or deactivated polycondensation catalyst used in the melt phase which can, during the melting of solid polyester particles in a melt processing zone, continue to catalyze the conversion of AA precursors, which are present in the polymer due to thermal degradation, to form free AA during subsequent melt processing to form the article. Adequately stabilizing and/or deactivating the polycondensation catalyst, therefore, reduces the amount of free AA generated during melt processing to form the article (reduces the AA generation rate), even though AA precursors may be present in the melt. While catalyst stabilization and/or deactivation does reduce the free AA generated in melt processing steps, some free AA is nevertheless generated. It is theorized that there may be an uncatalyzed route for conversion of precursors to free AA or that a lower level of catalytic activity may remain to convert some of the AA precursor species to free AA or that acid catalysis of AA precursors to free AA occurs or that some combination of 2 or more of the previous 3 options occurs; however, the invention is not bound by theory. Moreover, the ease to which catalyst metals can be deactivated differs from metal to metal. For example, Ti metal based catalysts can be deactivated with phosphorus compounds, for example, phosphate compounds The problem of controlling the presence of free AA and AA precursors produced in the melt-phase manufacture was discussed in EP 1 188 783 A2, equivalent to U.S. Pat. No. 6,559,271 B2. This patent proposes that the amount of free AA and AA precursors can be limited by keeping the reaction temperature during the entire polycondensation step below 280° C., by using a low dosage of a highly active titanium catalyst to limit the residence time of the polymer in the melt-phase manufacture, and by using an excess of AA scavenger added in the melt phase manufacture. To control AA generation from AA precursors produced in the melt phase manufacture, this patent teaches deactivating the catalyst with a phosphorus compound late toward or after the end of polycondensation so as to allow the catalyst to promote the molecular weight build-up to a intrinsic viscosity (It.V.) of 0.63 dL/g and higher. Finally, the amount of the AA scavenger or binder added must be in excess so as to bind not only the residual or free AA produced in the melt phase manufacture, but to also bind whatever free AA is generated in subsequent melt processing steps.

One problem with the approach of using an acetaldehyde scavenger is that they are expensive regardless of when they are added. Another problem of adding acetaldehyde scavengers to the melt phase manufacture is that a portion of the scavenger is consumed by the free acetaldehyde present in the melt phase manufacture, thereby requiring the addition of an excess amount of scavenger to bind subsequently formed acetaldehyde. As the amount of acetaldehyde scavenger added in the melt phase manufacture increases, so do costs and the degree of yellow hue imparted to the polymer by the scavenger, especially if a class of scavengers containing amine groups is used, like low molecular weight polyamides. The presence of some acetaldehyde scavengers may also lead to an increased concentration of black specks in the polyester particles or in the molded part. Moreover, the effectiveness of the scavenger may be impaired by undergoing two heat histories where the polyester is molten, especially when one of the heat histories is under high vacuum, high temperature, and high viscosity conditions (as in the melt phase polycondensation) where the thermal stability of some types of scavenger may be compromised and may be lost due to scavenger volatility. With some scavengers, the amount of yellow color imparted by the scavenger may increase as the number of melt heat histories increases. It would be desirable, therefore, to produce solid high IV polyester polymer particles which do not contain acetaldehyde scavengers added in the melt phase yet have both a low AA generation rate and low residual acetaldehyde levels when fed to a subsequent melt processing zone.

U.S. Pat. No. 5,898,058 discloses using any one of a large number of conventional polycondensation catalysts (with combinations of Sb catalysts and one of Co, Zn, Mg, Mn or Ca based catalysts exemplified and/or claimed) in which the catalysts are deactivated late. This patent notes that the traditional antimony polycondensation catalyst will begin to catalyze or encourage the degradation of the polymer, leading to the formation of acetaldehyde and yellowing of the polymer. Once the polycondensation reaction essentially reaches completion, further reaction allows the catalyst to degrade the polymer and form acetaldehyde and a yellow hue. The patent discloses the manufacture of polyester precursors at an It.V. of about 0.64 and 0.62 dL/g, or 0.60 dL/g which was increased to an It.V. of 0.81 dL/g by solid state polymerization. The patent notes that solid state polymerization techniques are useful to increase the It.V. of the polyester to these higher levels.

U.S. Pat. No. 5,656,716 discloses use of high surface area titanium catalysts followed by addition of triphenyl phosphate. Without the triphenyl phosphate, a high inherent viscosity but distinctly yellow product was obtained. With triphenyl phosphate, less colored products were obtained, but only at a low inherent viscosity, thus requiring solid stating of these products with its disadvantages.

It would be desirable to be able to produce PET and other polyesters with an inherent viscosity suitable for production of food and beverage containers without the necessity for solid stating, and with a lower content of acetaldehyde in the absence of organic AA scavengers, and/or with reduced levels of acetaldehyde generated during subsequent melt processing in the absence of organic AA scavengers. It would further be desirable to produce PET in shorter reaction time, due to a more active catalyst than antimony, while maintaining or improving upon the AA properties of the product, with or without solid state polymerization.

3. SUMMARY OF THE INVENTION

There is now provided a simple robust process for making a high IV polyester polymer in the melt phase without the addition of AA scavengers to the melt phase while providing a particle suitable as a feed to a subsequent melt processing zone for making preforms having an acceptable acetaldehyde level for the application and preferably containing acceptable residual acetaldehyde for the application. Also provided is a method for the production of solid polyester polymers comprising adding a catalyst deactivator to a polymer melt having an It.V. of at least 0.69 dL/g, preferably a phosphorus containing compound; and subsequently solidifying the melt into solid polyester polymer particles or molded articles which do not contain added organic acetaldehyde scavengers. Alternatively, the inventive polyester polymer may be solidified and the catalyst deactivatior may be added during a subsequent step in which the solid polyester is remelted to form a desired article (e.g., an injection molded bottle preform or extruded sheet.)

Because titanium is highly active in catalyzing PET compositions compared to analogous antimony catalyzed PET compositions, lower polycondensation temperatures and/or shorter residence times are required to achieve the same It.V. As a result of the milder polymerization conditions and catalyst deactivation, the titanium catalyzed PET compositions of the present invention are produced with 80 percent lower free AA and a 52 percent lower AA generation rate compared with antimony-catalyzed PET.

The invention further comprises a process of stripping free AA wherein the titanium catalyzed polyester polymer particles exhibiting reduced levels of free AA are introduced into a vessel at a temperature within a range of 130° C. to 195° C. to form a bed of particles within the vessel, flowing a gas through at least a portion of the particle bed, and withdrawing finished particles from the vessel having a further reduced amount of free AA. This process of AA stripping is directed to removing the free AA and does not affect AA precursors that lead to AA generation during subsequent melt processing into finished articles such as injection molded bottle performs or extruded films. However, the use of titanium to catalyze polycondensation followed by late addition of a catalyst deactivator yields a PET composition exhibiting about 50 percent lower AA generation rates than antimony catalyzed PET made with a similar finisher time or rate, thereby minimizing the conversion of the AA precursors to free AA during the subsequent melt processing.

There is also provided a method for the production of solid polyester polymer particles comprising:
- a) polycondensing a molten polyester polymer composition in the presence of a polycondensation catalyst composition comprising titanium species;
- b) adding a catalyst deactivator compound to the molten polyester polymer composition, preferably a phosphorus containing compound; and
- c) after reaching an It.V. of 0.69 dL/g or more, solidifying the molten polyester polymer composition into solid polyester polymer particles which do not contain added organic acetaldehyde scavengers; and
- d) reducing the amount of residual acetaldehyde in the solid particles to a level of 10 ppm or less in the solid state without increasing the It.V. of the particles by more than 0.03 dL/g;

wherein the catalyst deactivator compound is added to the molten polyester polymer composition in step b) at one or more of the following points:
- (i) within a final reactor for polycondensing the molten polyester polymer or between said final reactor and before a cutter for cutting the molten polyester polymer composition into said solid particles; or
- (ii) after the It.V. of the molten polyester polymer composition has risen to at least 0.5 dL/g; or
- (iii). vacuum applied to the molten polyester polymer melt, if any, is at least partially released; or
- (iv) following at least 75% of the polycondensation time; or
- (v) within ±0.10 dL/g, of the It.V. obtained upon solidification; or
- (vi) within 30 minutes before solidifying the melt.

There is also provided a method for the manufacture of articles comprising:
- (a) introducing solid polyester polymer particles, having:
  - (i) an It.V. of at least 0.72 dL/g obtained by melt phase polymerization,
  - (ii) a degree of crystallinity of at least 20% or at least 30%,
  - (iii) a residual acetaldehyde level of 10 ppm or less, or 5 ppm or less,
  - (iv) residues of a polycondensation catalyst composition comprising titanium species, preferably in an amount ranging from 3 to 35 ppm
  - (v) an AA generation rate of less than about 20 ppm, and
  - (vii) lacking added organic acetaldehyde scavengers,
  into a melt processing zone and melting the particles to form a molten polyester polymer composition; and
- (b) forming an article comprising a sheet, strand, fiber, or a molded part from the molten polymer composition.

The invention has the advantage of making high IV polymers in the melt phase while avoiding the addition of organic acetaldehyde scavengers to the melt phase which are expensive and contribute to the formation of color bodies and/or black specks. Instead of controlling the formation of acetaldehyde in the melt-phase manufacture by adding an acetaldehyde scavenger or reducing the It.V. to a low level, polyester polymer solids are produced in the melt-phase manufacture to have a low acetaldehyde generation rate while the free AA formed in the melt phase manufacture is reduced in the solid particles without increasing the molecular weight such that the It.V. is increase by more than 0.03 dL/g. The preferred process provides solid particles having a high It.V. obtained in melt phase manufacture without acetaldehyde scavengers and which are suitable as a feed to a subsequent melt processing zone for making preforms or other articles, and more preferably, such solid polyester polymer particles having an It.V. of at least 0.69 dL/g are not solid state polymerized when packaged into shipping containers or prior to their introduction into subsequent melt processing equipment for making articles such as trays and bottle preforms.

In another aspect, other achievable advantages employ a robust and simple process which allows one the flexibility of avoiding solid state polymerization so that a phosphorus compound can be added late to promote stabilization and/or catalyst deactivation without concern as to the impact on melt-phase polymerization rates and also allows the use of titanium-containing catalysts which can produce polymer compositions suitable to make articles having less catalyst particulates and hence, increased clarity and decreased crystallization rates from the melt good brightness (high L* color) and acceptable yellowness (low b* color).

4. DETAILED DESCRIPTION OF THE INVENTION

The present invention may be understood more readily by reference to the following detailed description of the invention.

It must also be noted that, as used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles. References to a composition containing "an" ingredient or "a" polymer is intended to include other ingredients or other polymers, respectively, in addition to the one named.

By "comprising" or "containing" or "obtained by" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

By "melt phase only process" or a "melt phase only polymer" is meant that a polyester polymer polycondensed to an I.V. or about 0.69 dL/g or more without subjecting the polymer to an increase in its It.V. by more than 0.03 dL/g in the solid state prior to shipping the polymer in a shipping container (truck, ship, Gaylord box, railcar, etc) from the manufacturer of the polymer to a customer converting the polymer to an article, or prior to melting the polymer to form a finished product.

The invention relates to a method for the production of solid polyester polymer particles comprising:
- a) polycondensing a molten polyester polymer composition in the presence of a polycondensation catalyst composition comprising titanium species;
- b) adding a catalyst deactivator compound to the molten polyester polymer composition, for example, a phosphorus containing compound;
- c) after reaching an It.V. of 0.69 dL/g or more, solidifying the molten polyester polymer composition into solid polyester polymer particles which do not contain added acetaldehyde scavengers; and
- d) reducing the amount of residual acetaldehyde in the solid particles to a level of 10 ppm or less in the solid state without increasing the It.V. of the particles by more than 0.03 dL/g;

wherein the catalyst deactivator compound is added to the molten polyester polymer composition in step b) at one or more of the following points:
- (i) within a final reactor for polycondensing the molten polyester polymer or between said final reactor and before a cutter for cutting the molten polyester polymer composition into said solid particles; or
- (ii) after the It.V. of the molten polyester polymer composition has risen to at least 0.5 dL/g, or to at least 0.6 dL/g, or to at least 0.68 dL/g, or to at least 0.72 dL/g, or to at least 0.76 dL/g, or to at least 0.80 dL/g; or
- (iii). vacuum applied to the molten polyester polymer melt, if any, is at least partially released; or
- (iv) following at least 75% of the polycondensation time, or at least 80%, or at least 90%, or even at least 95%, of the polycondensation time. The polycondensation time is the total time starting from initiating polycondensation to the point in time at which polycondensation is terminated or when the desired It.V. is obtained. For purposes of measuring time, when the polymer melt exits the final reactor and the vacuum is released, the final It.V. is obtained even though it is recognized that a very minor It.V. lift or break may occur between the final reactor and cutter. Or
- (v) within ±0.1 dL/g, or within 0.05 dL/g, or within 0.03 dL/g, or within 0.015 dL/g, of the It.V. obtained upon solidification; or
- (vi) within 30 minutes or within 20 minutes or within 10 minutes or within 5 minutes or within 3 minutes before solidifying the melt.

The "polyester polymer" of this invention is any thermoplastic polyester polymer. Polyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container.

The polyester polymer is desirably a random polymer such that the monomer units in the polymer chain are randomly arranged rather than arranged in a block fashion.

The polyester polymer desirably contains alkylene terephthalate or alkylene naphthalate repeat units in the polymer chain. More specific examples of these repeating units include ethylene terephthalate, ethylene naphthalate, and trimethylene terephthalate. In one aspect, are polyester polymers which comprise:

- (i) a dicarboxylic acid component comprising at least 60 mole % of the residues of terephthalic acid, derivatives of terephthalic acid, naphthalene-2,6-dicarboxylic acid, derivatives of naphthalene-2,6-dicarboxylic acid, or mixtures thereof, and
- (ii) a diol component comprising at least 60 mole % of the residues of ethylene glycol or propane diol, based on 100 mole percent of dicarboxylic acid component residues and 100 mole percent of diol component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing dicarboxylic acid group(s) or derivative(s) thereof can be reacted during the process. All the compounds that enter the process containing dicarboxylic acid group(s) or derivative(s) thereof that become part of said polyester product comprise the "dicarboxylic acid component." The mole % of all the compounds containing dicarboxylic acid group(s) or derivative(s) thereof that are in the product add up to 100. The "residues" of compound(s) containing dicarboxylic acid groups or derivatives thereof that are in the said polyester product refers to the portion of said compound(s) which remains in the said polyester product after said compound(s) is condensed with a compound(s) containing diol groups and further polycondensed to form polyester polymer chains of varying length.

More than one compound containing diol groups or derivatives thereof can become part of the polyester polymer product(s). All the compounds that enter the process containing hydroxyl groups or derivatives thereof that become part of said polyester product(s) comprise the diol component. The mole % of all the compounds containing diol groups or derivatives thereof that become part of said polyester product(s) add up to 100. The "residues" of diol functional compound(s) or derivatives thereof that become part of said polyester product refers to the portion of said compound(s) which remains in said polyester product after said compound(s) is condensed with a compound(s) containing dicarboxylic acid group(s) or derivative(s) thereof and further polycondensed to form polyester polymer chains of varying length.

The mole % of the diol residues and dicarboxylic acid residues in the product(s) can be determined by proton NMR. A suitable solvent system for proton NMR is 70% deuteriated chloroform and 30% deuteriated trifluoroacetic acid, by volume.

In one aspect, the polyester polymer comprises:
- (a) a dicarboxylic acid component comprising, for example, at least 80 mole %, at least 90 mole %, or at least 92 mole %, or at least 96 mole % of the residues of terephthalic acid, derivatives of terephthalic acid, naphthalene-2,6-dicarboxylic acid, derivatives of naphthalene-2,6-dicarboxylic acid, or mixtures thereof, and
- (b) a diol component comprising, for example, at least 80 mole %, at least 90 mole %, or at least 92 mole %, or at least 96 mole % of the residues of ethylene glycol, based on 100 mole percent of the dicarboxylic acid component residues and 100 mole percent of the diol component residues in the polyester polymer.

The reaction of the dicarboxylic acid component with the diol component during the preparation of the polyester polymer is not restricted to the stated mole percentages since one may utilize a large excess of the diol component if desired (e.g., on the order of up to 200 mole % relative to the 100 mole % of dicarboxylic acid component used.) The polyester polymer made by the reaction may, however, contain the stated amounts of aromatic dicarboxylic acid residues and diol residues.

Derivatives of terephthalic acid and naphthalane dicarboxylic acid may include, for example, $C_1$-$C_4$ dialkylterephthalates and $C_1$-$C_4$ dialkylnaphthalates, such as dimethylterephthalate and dimethylnaphthalate.

The polyester polymers of the invention may be modified by adding a comonomer(s) to the melt phase polymerization process. Comonomers may be present in amount, for example, of up to about 40 mole %, or up to about 20 mole %, or up to about 10 mole %, or up to about 8 mole %, or up to about 5 mole %, or at least 2 mole %, or at least 4 mole %, or at least 5 mole %, or at least 7 mole %, or at least 8 mole %, or at least 10 mole %, or at least 15 mole %, based on the 100 mole percent of their respective component, carboxylic acid or hydroxyl in the polymer. The amount of the comonomer added or present in the polyester polymer is based on the amount of comonomer added to the polyester polymer excluding modification resulting from incorporation of by-products formed in the melt phase polymerization process.

In addition to a dicarboxylic acid component of terephthalic acid, derivates of terephthalic acid, naphthalene-2,6-dicarboxylic acid, derivatives of naphthalene-2,6-dicarboxylic acid, or mixtures thereof, the dicarboxylic acid component(s) of the present polyester may include one or more additional modifier carboxylic acid compounds, or comonomers. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids include one or more of: phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these dicarboxylic acids is included in the term "dicarboxylic acid". It is also possible for tricarboxylic acid compound branching agents and compounds with a higher number of carboxylic acid groups to modify the polyester, along with monocarboxylic acid chain terminators.

In addition to a diol component comprising ethylene glycol, the diol component of the present polyester may include additional modifier mono-ols, diols, or compounds with a higher number of hydroxyl groups as comonomers. Examples of modifier hydroxyl compounds include cycloaliphatic diols preferably having 6 to 20 carbon atoms and/or aliphatic diols preferably having 3 to 20 carbon atoms. More specific examples of such diols include one or more of: diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1, 3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

In another aspect, the polyester polymer may contain such comonomers as isophthalic acid, naphthalane dicarboxylic acid, 1,4-cyclohexanedimethanol, and diethylene glycol.

The polyester polymers of the present invention may be blended with one or more other thermoplastic polymers such as polycarbonate (PC) and polyamides to form a polyester blend. In one aspect, the polyester blend comprises a majority of the inventive polyester polymers, for example, in an amount of at least 80 wt. %, or at least 95 wt. %, or 100 wt. %, based on the weight of all thermoplastic polymers (excluding fillers, inorganic compounds or particles, fibers, impact modifiers, or other polymers which may form a discontinuous phase). In another aspect, the polyester blends do not contain any fillers, fibers, or impact modifiers or other polymers which form a discontinuous phase.

In another aspect, the polyester polymers of the present invention may be blended with post-consumer recycled polyester polymer (PCR) in an amount, for example, less than about 60 wt %, or less than 40 wt %, or less than 20 wt. %, or less than 10 wt. %, or less than 5 wt. %, or in the absence of PCR, based on the total weight of all polyester in the blend. In another aspect, the blend contains PCR, for example, present in an amount greater than zero and up to 60 wt. %, or up to 40 wt. %, or up to 20 wt %, or up to 10 wt. %, based on the total weight of the blend.

Polyester melt phase manufacturing processes utilized to prepare the polyester polymers of the present invention include direct condensation of a dicarboxylic acid with the diol, optionally in the presence of esterification catalysts, in the esterification zone, followed by polycondensation in the prepolymer and finishing zones in the presence of a polycondensation catalyst composition comprising titanium species; or ester exchange usually in the presence of a transesterification catalyst in the ester exchange zone, followed by prepolymerization and finishing in the presence of a polycondensation catalyst composition comprising titanium species.

The melt phase reaction proceeds in a batch, semi-batch, or continuous mode. Preferably, the process of the invention is continuous. In the process of the invention, polyester polymers are made in a melt phase reaction comprising forming a polyester polymer melt in the presence of a titanium compound.

Polyester precursor reactants are fed to an esterification reaction vessel where the first stage of the melt phase process is conducted. The esterification process proceeds by direct esterification or by ester exchange reactions, also known as transesterification. In the second stage of the melt phase process, the oligomer mixture formed during esterification is polycondensed to form a melt of polyester polymer. The molecular weight of the melt continues to be increased in the melt phase process to the desired It.V.

To further illustrate, a mixture of one or more dicarboxylic acids, preferably aromatic dicarboxylic acids, or ester forming derivatives thereof, and one or more diols are continuously fed to an esterification reactor operated at a temperature of between about 200° C. and 300° C., and at a pressure of between about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 285° C.

The esterification reaction is continued until an acid or ester group conversion of, for example, at least 70% is achieved, but more typically until an acid or ester group conversion of at least 85% is achieved to make the desired oligomeric mixture (or otherwise also known as the "BHET monomer"). The reaction to make the oligomeric mixture is typically uncatalyzed in direct esterification processes and catalyzed in ester exchange processes. The titanium containing catalyst may optionally be added in the esterification zone along with raw materials; however, activity of the catalyst for polycondensation may be less, depending on the type of titanium catalyst used. Typical ester exchange catalysts which may additionally be used in an ester exchange reaction between a dialkylterephthalate and a diol may be, for example, titanium alkoxides, tin (II) or (IV) esters, zinc compounds such zinc acetate, or manganese compounds such as manganese acetates or benzoates and/or other such catalyst compounds, each used singly or in combination with each other. Any other catalyst materials well known to those skilled in the art are suitable. In one aspect, the ester exchange reaction proceeds in the presence of titanium compounds.

The resulting oligomeric mixture formed in the esterification zone (which includes direct esterification and ester exchange processes) includes bis(2-hydroxyethyl)terephthalate (also known as "BHET monomer"), low molecular weight oligomers, DEG, and trace amounts of condensation by-product (e.g., water or methanol) not removed in the esterification zone, along with other trace impurities from the raw materials and/or possibly formed by catalyzed side reactions, and other optionally added compounds such as toners and stabilizers. The relative amounts of BHET monomer and oligomeric species will vary depending on whether the process is a direct esterification process in which case the amount of oligomeric species are significant and even present as the major species, or a ester exchange process in which case the relative quantity of BHET monomer predominates over the oligomeric species. Condensation by-product is removed as the esterification reaction proceeds in order to drive the equilibrium toward the desired products. The esterification zone typically produces the BHET monomer and oligomer species, if any, continuously in a series of one or more reactors. Alternately, the BHET monomer and oligomer species in the oligomeric mixture could be produced in one or more batch reactors. It is understood, however, that in a process for making PEN, the reaction mixture will contain the monomeric species bis (2-hydroxyethyl)-2,6-naphthalate and its corresponding oligomers. At this stage, the It.V. is usually not measurable or is less than 0.1. The average degree of polymerization of the molten oligomeric mixture is typically less than 15, and often less than 7.0.

Once the oligomeric mixture is made to the desired percent conversion of the acid or ester groups, it is transported from the esterification zone or reactors to the polycondensation zone. The commencement of the polycondensation reaction is generally marked by either a higher actual operating temperature than the operating temperature in the esterification zone, or a marked reduction in pressure compared to the esterification zone, or both. In some cases, the polycondensation reaction is marked by higher actual operating temperatures and lower (usually sub-atmospheric) pressures than the actual operating temperature and pressure in the esterification zone. Typical polycondensation reactions occur at temperatures ranging from about 260° C. and 300° C., and at sub-atmospheric pressure of between about 350 mmHg to 0.2 mm Hg. The residence time of the reactants typically ranges from between about 2 to about 6 hours. In the polycondensation reaction, a significant amount of glycols are evolved by the condensation of the oligomeric ester species and during the course of molecular weight build up.

The polycondensation zone is typically comprised of a prepolymer zone and a finishing zone, although it is not necessary to have split zones within a polycondensation zone. Polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight BHET monomers and oligomers in the oligomeric mixture are polymerized via polycondensation to form polyethylene terephthalate polyester (or PEN polyester) in the presence of a titanium-containing catalyst. The catalyst composition comprising Ti species may be added in the esterification or polycondensation zones, such as immediately prior to initiating polycondensation, during polycondensation, or to the esterification zone prior to initiating esterification or ester exchange or during or upon completion of the esterification or ester exchange reaction. If the titanium containing catalyst is added to the esterification zone, it is typically blended with the diol(s) and fed into an esterification reactor(s) and/or into a paste tank containing a paste of terephthalic acid and glycol that is fed into the first esterification reactor. In a typical DMT-based process, those skilled in the art recognize that other catalyst material and points of adding the catalyst material and other ingredients such as phosphorus compounds vary from a typical direct esterification process.

With some titanium species, the catalytic activity for polycondensation is higher when the titanium compound is added after esterification. In one aspect, the titanium compound(s) may be added after esterification and before or at the initiation of or during polycondensation. In another aspect, the titanium compound(s) may be added between esterification and polycondensation or early in the polycondensation, such as to a prepolymerization step (the first stage of polycondensation) to catalyze the reaction between the monomers and between the low molecular weight oligomers and between each other to build molecular weight and split off the diol(s) as a by-product. If the titanium compound will be less catalytically active after being present during esterification, it is added preferably to a direct esterification process when the percent conversion of the acid end groups is at least 75%, more preferably when the % conversion of the acid end groups is at least 85%, and most preferably when the % conversion of the acid end groups from esterification is at least 93%.

In another aspect, a titanium compound is added to the oligomer mixture upon or after completion of esterification or to a polyester melt, for example, no later than when the It.V. of the melt reaches about 0.3 dL/g, or no later than when the It.V. of the melt reaches about 0.2 dL/g, or no later than when the It.V. of the melt reaches about 0.1 dL/g, or to the oligomer mixture exiting the esterification zone, or prior to commencing or at the start of polycondensation.

Other compounds such as cobalt compound and colorants may also be added in the prepolymerization zone. These compounds may, however, be added in the finishing zone instead of or in addition to the prepolymerization zone and esterification zone.

Preferably, the titanium catalyst exhibits in the absence of phosphorus compounds at least the same rate of polycondensation as is achieved using antimony triacetate or antimony trioxide in conventional amounts and at the same temperature, and more preferably exhibits a considerably greater rate of polycondensation in the absence of phosphorus compounds, for example a rate from 10 to 50 times higher than antimony triacetate or antimony trioxide, based in part on the weight of the catalytic element relative to the weight of the polymer. A polyester of suitable inherent viscosity can be produced under similar conditions in shorter time than in an antimony catalyzed polycondensation, while also using much less catalyst. Alternatively, the titanium catalyst preferably exhibits in the absence of phosphorus compounds at least the same rate of polycondensation at lower temperatures as is achieved using antimony triacetate or antimony trioxide in conventional amounts and at higher temperatures. A polyester of suitable inherent viscosity can be produced under milder conditions in a similar time to an antimony catalyzed polycondensation under harsher conditions, while also using much less catalyst.

Titanium catalysts include, in general, titanium (IV) compounds such as alkoxides, glycolates, acetates, oxalates, etc. Alkoxides and mixed glycolate alkoxides are especially suitable. Titanium alkoxides include, for example, acetyl triisopropyl titanate, tetraisopropyl titanate and tetraisobutyl titanate. Especially suitable titanium catalytic materials include acetyl triisopropyl titanate and tetraisopropyl titanate, a.k.a. titanium (IV) isopropoxide. Many such catalysts are available commercially (e.g., under the trademark Tyzor® titanates from DuPont.) Solid titanium compounds which serve as heterogenous catalysts are also suitable, including those disclosed in U.S. Pat. No. 5,656,716, incorporated herein by reference. Titanium oxides and hydrated oxides may become solubilized during the course of the polymerization, for example by complexation and/or reaction with the glycol component. If catalysts remain insoluble, at least in part, catalytic activity would be a concern, as would haze (lack of clarity). Soluble catalysts are preferred, more preferably, those catalysts which are soluble at the outset of the reaction. The titanium catalysts may be introduced into the reaction in any convenient manner. A solution of the catalyst in alcohol or a slurry of the catalyst in ethylene glycol may be used, for example, as may be a solution or slurry of the catalyst in an oligomer mixture. The catalyst may also be added alone, and distributed by agitation (i.e., by mechanical mixing or by use of a static mixer.)

The molten polyester polymer is polycondensed in the presence of a polycondensation catalyst composition comprising a titanium species. When referencing "titanium," or any other inorganic catalyst, the titanium or other inorganic catalyst atom is present in any oxidation state. When referencing "elemental titanium" or any other inorganic catalyst in its elemental state, the oxidation state is zero.

X-ray fluorescence (XRF) is the analytical technique used to report catalyst levels in polymers of the invention. By convention, the XRF technique is referred to as "elemental analysis." In actuality, the XRF test is unaffected by the oxidation state of an inorganic-containing species; therefore, it can not differentiate between different oxidation states. The use of the term Ti atoms does not imply any particular oxidation state. Measured titanium levels in the polyester are reported as the amount of Ti atoms in ppm based on the weight of the polyester polymer, and not in terms of levels of the titanium compounds added. In one aspect, the amount of titanium catalyst added may be, for example, at least 2, or at least 4, or at least 6 ppm based on the weight of the polyester polymer. In another aspect, the amount of titanium is, for example, less than about 50 ppm, or less than 30 ppm, or less than 20 ppm, or 15 ppm or less, or 13 ppm or less, or 10 ppm or less, based on the weight of the polyester polymer. In still another aspect, the amount of Ti may be, for example, at least about 3 ppm, or at least 4 ppm, or at least 5 ppm, or at least 6 ppm, or at least 7 ppm, based on the weight of the polyester polymer. In yet another aspect, the range of titanium may be from, for example, about 3 to less than about 20 ppm, or from about 4 ppm to less than 15 ppm, or from about 5 ppm to less than 10 ppm, in each case based on the weight of the polyester.

Using a titanium-based catalyst is advantageous because the finished articles made from titanium-catalyzed polymers are usually brighter (higher L* color) than polymers catalyzed by an antimony-based catalyst due to the reduction of antimony catalyst to antimony metal giving the polymer a grey hue. Furthermore, the melt phase polycondensation reaction promoted by a titanium catalyst in accordance with the invention is capable of producing a base polymer having an acceptable b* below +5 when produced in the absence of an AA scavenger which imparts a yellow hue. Without the additional yellow hue contributed by the AA scavenger, toners or colorants can be incorporated into the titanium catalyzed base resin to obtain a b* value of, for example, no greater than 3.0, while maintaining an L* brightness of, for example, at least 70, or at least 73, or at least 76, or at least 80.

In one aspect, the crystallized polyester polymer obtained by the process of the invention has an L* of, for example, at least about 70, or at least 73, or at least 76, or at least 79.

Other catalysts which may be optionally present along with titanium species may be catalysts containing antimony, zinc, cobalt, manganese, tin, germanium, and other known metals. In one aspect, however, the polycondensation catalyst composition consists essentially of titanium species, meaning that the amount of other metal species in combination with titanium should not increase the b* of the solid polyester polymer particles by, for example, more than about 0.5 CIELAB units and/or lower the L* of the solid polyester polymer particles by more than, for example, about 1 CIELAB unit under the reaction conditions used relative to a composition made in the absence of any metal other than Ti under the same reaction conditions. In one aspect, the cumulative amount of catalyst metals other than Ti are not added to the melt phase polymerization process in an amount of, for example, more than about 50 ppm, or more than 30 ppm, or more than 15 ppm, or more than 10 ppm, or more than 5 ppm. One of the advantages of the inventive process lies in the simplicity of manufacturing a polyester polymer by direct esterification at acceptable rates without the need for employing more than one catalyst. Accordingly, in another aspect, the polycondensation takes place in the presence of a polycondensation catalyst composition consisting exclusively of titanium species, meaning that no other metal catalyst compounds, such as antimony, gallium, germanium, zinc, manganese, or magnesium, are added in the melt-phase manufacturing process to actively catalyze the polycondensation reaction in the melt. In another aspect, no other metal compounds, including cobalt, are added. It is to be recognized, however, that one or more of metals such as cobalt or manganese will most likely be present at low levels in the melt because they come as impurities with the terephthalic acid composition made from a metal catalyzed liquid phase oxidation process, but in one aspect, these metals are not added to the melt phase production process.

In one aspect, germanium catalysts are not added to the polymer melt, or the polycondensation reaction takes place in the absence of added source of germanium as a catalyst, or the polyester polymer, particles, performs or bottles do not contain a source of germanium atoms.

The prepolymer polycondensation stage generally employs a series of one or more vessels and is operated at a temperature of between about 230° C. and 305° C. for a period between about five minutes to four hours. During this stage, the It.V. of the monomers and oligomers are increased generally up to about no more than 0.45 dL/g. The diol byproduct is removed from the prepolymer melt generally using an applied vacuum ranging from about 4 to 200 torr to drive the polycondensation of the melt. In this regard, the polymer melt is sometimes agitated to promote the escape of the diol from the polymer melt. As the polymer melt is fed into successive vessels, the molecular weight and thus the melt viscosity, which is related to the intrinsic viscosity, of the polymer melt increases. The pressure of each vessel is generally decreased to allow for a greater degree of polymerization in each successive vessel or in each successive zone within a vessel. To facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, argon, helium and nitrogen.

Once the desired It.V. in the prepolymerization zone is obtained, generally, for example, no greater than about 0.45 dL/g, or no greater than about 0.3 dL/g, or no greater than about 0.2 dL/g, the prepolymer is fed from the prepolymer zone to a finishing zone where the second stage of polycondensation is continued in one or more finishing vessels generally, but not necessarily, ramped up to higher temperatures than present in the prepolymerization zone, to a value, for example, within a range of from about 250° C. to about 310° C., or from about 270 to about 300° C., until the It.V. of the melt is increased to an It.V., for example, at least about 0.68 dL/g, or at least 0.70 dL/g, or at least 0.72 dL/g, or at least 0.75 dL/g and up to about 1.2 dL/g.

In one aspect, the temperature applied to the polymer melt or of the polymer melt in at least a portion of the polycondensation zone is, for example, greater than about 280°, and up to about 290° C. In another aspect, the temperatures in the finishing zone are, contrary to conventional practice, lower than about 280° C. in order to avoid rapid increases in the rate of AA precursor formation. The final vessel, generally known in the industry as the "high polymerizer," "finisher," or "polycondenser," is also usually operated at a pressure lower than used in the prepolymerization zone to further drive off the diol and/or other byproducts and increase the molecular weight of the polymer melt. The pressure in the finishing zone may be within the range of, for example, about 0.2 to about 20 mm Hg, or about 0.2 to about 10 mm Hg, or about 0.2 to about 2 mm Hg. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically but not necessarily mechanically agitated to facilitate the removal of the diol and/or other byproducts.

In step b) of the process, a catalyst deactivator is added to the polymer melt. In one aspect, the catalyst deactivator is added after the complete addition of Ti catalyst. By a catalyst deactivator is meant a compound effective to at least partially deactivate the Ti catalytic activity. A compound is effective to at least partially deactivate a titanium catalyst when by its addition at a given level, the rate of AA generation upon melting particles or the free AA level in the perform is reduced relative to the no additive case and/or, solely for testing the functionality of a compound at a given level, a) when the rate of solid-stating under actual operating conditions is reduced relative to the same polymer without the deactivator ("no additive case"), or b) when added earlier, the rate of melt-phase polycondensation to a constant It.V. target under actual operating conditions is reduced, that is, it takes more time to reach the It.V. target, or the It.V. of the polymer is reduced at constant time relative to the no additive case.

In another aspect, the catalyst deactivator also reduces the rate of AA generation upon melting particles relative to the no additive case (i.e., to lower the contribution of AA generation on free AA levels in a molded article, such as a preform, relative to a no additive case). In another aspect, the catalyst deactivator reduces the rate of AA generation upon melting particles having an It.V. of at least 0.68 dL/g obtained from a melt phase polymerization relative to the no additive case.

In one aspect, the catalyst deactivator is added late during manufacturing to the polymer melt in order to limit the activity of the titanium during subsequent melt processing steps and which would otherwise catalyze the conversion of acetaldehyde precursors present in the polymer to free acetaldehyde. Left untreated, the polymer would have a high acetaldehyde generation rate during extrusion or injection molding and would produce an unacceptable amount of free acetaldehyde in the preforms and bottles made from the polymer. The catalyst deactivator can also help thermally stabilize the polymer melt near the end of melt phase polycondensation and during melting of solid polyester particles, for example, melt processing into articles, without which more reactions would occur to cleave the polymer chains in the highly viscous melt, a route to forming more AA precursors and ultimately, more free AA. In addition to lowering the formation rate of AA precursors and free AA, the catalyst deactivator may improve the hydrolytic stability of the polymer. Any side reaction at least partially catalyzed by the polycondensation catalyst system may be less of a problem when the polycondensation catalyst system is at least partially deactivated. Addition of catalyst deactivators to the melt is more efficient than deactivation of catalyst in the solid state. In addition, solid state metal deactivation techniques, such as hot water treatment (60-130 C) for extended periods of time (30 minutes or greater), do not offer the economic advantages of catalyst deactivation in the melt phase.

In an ester exchange reaction, a catalyst deactivator can be added at the conclusion of the ester exchange reaction and before polycondensation in molar amounts sufficient to deactivate the ester exchange catalyst without significantly impairing the catalytic activity of the titanium-containing catalyst added after deactivating the ester exchange catalyst. However, the ester exchange catalyst does not have to be deactivated prior to adding the titanium containing catalyst if the ester exchange catalyst does not unduly impair the color or thermal stability or other desired property of the resulting polyester polymer melt phase product.

The catalyst deactivator is, for example, a phosphorus containing compound. The phosphorus compounds contain one or more phosphorus atoms and include, for example, phosphate triesters and acidic phosphorus compounds or their ester derivatives. Acidic phosphorus compounds are defined as having at least one oxyacid group, that is, at least one phosphorus atom double-bonded to one oxygen and single-bonded to at least one hydroxyl or OH group.

Specific examples of phosphorus compounds include phosphoric acid, pyrophosphoric acid, phosphorous acid, polyphosphoric acid, carboxyphosphonic acids, alkylphosphonic acids, phosphonic acid derivatives, and each of their acidic salts and acidic esters and derivatives, including acidic phosphate esters such as phosphate mono- and di-esters and non-acidic phosphate esters (e.g. phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mono-, di-, and tri-esters of phosphoric acid with ethylene glycol, diethylene glycol, or 2-ethylhexanol, or mixtures of each. Other examples include distearylpentaerythritol diphosphite, mono- and di-hydrogen phosphate compounds, phosphite compounds, certain inorganic phosphorus compounds that are preferably soluble in the polymer melt, poly(ethylene) hydrogen phosphate, and silyl phosphates. Haze in solutions of particles or in molded parts is one indication of the lack of solubility or limited solubility of an additive in the polymer melt. Soluble additives are more likely to deactivate/stabilize the catalyst system.

Since the catalyst system used in the invention can easily be at least partially deactivated, phosphorus compounds previously found to be less effective with antimony catalyzed systems, such as the full esters of acidic phosphorus compounds, like phosphate triesters, can now be used in the polymer melt and process of the invention. Moreover, phosphorus compounds found to cause an increase in haze with antimony catalyzed systems, such as phosphorous acid, may be used as a deactivator with the catalyst system of the present invention without acting to decrease the brightness and to increase the haze due to reduction of a metal, which, in the case of antimony catalyzed systems, imparts a gray or black color to the polyester. Unlike conventional antimony catalyst, titanium catalyst of the present invention is not reduced by certain phosphorus compounds to their elemental form, that is to the zero oxidation state, and as such are not as susceptible to degradation of L* (i.e., to graying). Therefore, performs and bottles produced using the titanium catalyzed polyesters of the present invention are brighter and clearer than performs and bottles made from antimony catalyzed polyester polymers.

In the conventional antimony catalyst system, if the antimony metal and antimony phosphate particles are large enough, they can scatter light and cause particulate haze. Smaller particles of antimony metal and antimony phosphate can nucleate crystallization and cause crystalline haze. In addition, when water is present due to incomplete drying of the PET and/or additives, moisture sensitive haze can result. Unlike conventional antimony catalyst that is used at about 250 ppm, titanium catalyst of the present invention is used at much lower levels and results in a much low concentration of catalyst particles or residues in the PET; therefore, titanium-catalyzed PET crystallizes much slower than conventional antimony catalyzed PET. Slower crystallization from the melt means that less heat is needed in the extruder portion of injection molding process to mold clear preforms; therefore, the cooling time is shorter and hence, the injection molding cycle time is decreased, that is, more, clear bottle preforms can be made per unit time. Slower crystallization from the melt is especially desirable when molding thick parts.

The catalyst deactivator is not added along with the addition of titanium compound nor is it added at the commencement of polycondensation because it would inhibit the catalytic activity of the metal catalysts and hence, the rate of polycondensation. It should be noted, however, that not all types or forms of phosphorus compounds are deactivators, and if they are not, they may, if desired, be added along with the catalyst or at the commencement of polycondensation.

If the catalyst deactivator is added too early in the polymerization process, as defined by the It.V. of the polymer, it may be more difficult or impossible to reach a high target It.V. in a reasonable process time. Thus, as stated earlier, the additive is incorporated at a late stage in the polycondensation, preferably near the finisher exit or just prior to pelletization or other means of solidification from the melt to reduce the free AA content in the formed solids.

Since one of the benefits of the invention is the ease with which the catalyst system may be deactivated, care should be taken not to add the catalyst deactivator too early as this would retard the polycondensation rate. The addition of the final amount of desired catalyst deactivator should be completed only upon substantial completion of polycondensation and thereafter, and preferably, the final amount of desired catalyst deactivator should not be added to the polymer melt in the melt phase manufacturing process until substantial completion of the polycondensation or thereafter.

In an aspect in which the catalyst deactivator is added in the melt phase polymerization, by the final amount of catalyst deactivator is meant the final amount of catalyst deactivator desired in the polyester polymer exiting the melt phase manufacturing process or as appearing in a pellet. If desired, a partial amount of catalyst deactivator may be added early in the melt phase manufacturing process, such as at the initiation of polycondensation or after the last esterification reactor or zone, provided that a portion of catalyst deactivator representing the final amount is added late in the course of polycondensation or thereafter but before solidification as explained further below. To maximize polycondensation and/or production rates, the majority, or preferably the bulk, or most preferably the whole of the catalyst deactivator is added late to the melt phase manufacturing process.

In another aspect where the catalyst deactivator is added to a melt phase polymerization process, the catalyst deactivator is added to the polyester melt late during the course of polycondensation and before solidification. The catalyst deactivator is added to the polyester melt late in the course of the polycondensation reaction when one or more of the following conditions are satisfied or thereafter and before solidification of the polyester melt:

(i) within a final reactor for polycondensing the molten polyester polymer or between said final reactor and before a cutter for cutting the molten polyester polymer composition into said solid particles; or (ii) after the It.V. of the molten polyester polymer composition has risen to at least 0.5 dL/g, or to at least 0.6 dL/g, or to at least 0.68 dL/g, or to at least 0.72 dL/g, or to at least 0.76 dL/g, or to at least 0.80 dL/g; or (iii) vacuum applied to the molten polyester polymer melt, if any, is at least partially released; or (iv) following at least 75% of the polycondensation time, or at least 80%, or at least 90%, or even at least 95%, of the polycondensation time. The polycondensation time is the total time starting from initiating polycondensation to the point in time at which polycondensation is terminated or when the desired It.V. is obtained. For purposes of measuring time, when the polymer melt exits the final reactor and the vacuum is released, the final It.V. is obtained even though it is recognized that a very minor It.V. lift or break may occur between the final reactor and cutter. Or (v) within ±0.1 dL/g, or within 0.05 dL/g, or within 0.03 dL/g, or within 0.015 dL/g, of the It.V. obtained upon solidification; or (vi) within about 30 minutes or within 20 minutes or within 10 minutes or within 5 minutes or within 3 minutes before solidifying the melt.

In one aspect, the deactivator is added to the polyester melt after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g, or at least 0.80 dL/g, and most preferably, regardless of when the deactivator is added, the resulting polymer exiting the melt phase manufacture has an It.V. of at least 0.68 dL/g or at least 0.72 dL/g or at least 0.76 dL/g.

In another aspect, the deactivator is added to the polyester melt during or after at least the partial release of vacuum from the polyester melt undergoing polycondensation reactions, or after bringing the pressure in a polycondensation zone or reactor from a lower level of at most 10 mm Hg or less or preferably from a lower level of at most 3 mm Hg or less to a level of 300 mm Hg or greater, or 450 mm Hg or greater, or 600 mm Hg or greater, or to atmospheric pressure or greater, and preferably before the polyester melt is solidified.

In another aspect, the deactivator is added within a final reactor for polycondensing the molten polyester polymer or between said final reactor and before a cutter for cutting the molten polyester polymer composition into said solid particles. For example, the deactivator is added to a location within 50% of the distance to the outlet of the reactor, where the distance between the inlet to the reactor and the outlet is 100%, or within 25% or said distance, or within 10% of said distance, or at a location proximal to the outlet of the reactor, or to a pipe connecting directly or indirectly the last polycondensation reactor and a gear pump or extruder providing the motive force to drive the melt through a die plate for cutting wherein said pipe is directed back to or proximal to the outlet or the bottom of the last polycondensation reactor, or to a pipe inlet to the last polycondensation reactor that is proximal to its outlet. By proximal to the outlet of the last polycondensation reactor, it is meant that the addition location is within the last 25% or less of said reactor or with within the last 15% or less of said reactor or preferably in the last 10% or less of said reactor. The percentage can be by length or height or volume of the last polycondensation reactor. Preferably the percentage is by length or height. The last percentages of lengths, heights or volumes are measured starting from the last polycondensation reactor's outlet. The addition point is deemed to be within the claimed percentage if a measurement by any one of the height, length, or volume is satisfied, unless one of such criteria is also claimed.

In yet another aspect, the deactivator is added to the polyester melt following at least about 75%, or at least 80%, or at least 90%, or at least 95%, or at least 98%, or up to about 100% of the average polycondensation time. The average polycondensation time is measure of the average time elapsed between when a given portion of melt enters the start of polycondensation zone to when that given portion of melt reaches the exit of the polyester melt from the last polycondensation reactor. The average polycondensation time or average residence time in the polycondensation zone can be measured by tracer studies or modeling.

In another aspect, the deactivator is added to the polyester melt when the It.V. of the polyester melt is within about 0.1 dL/g, or within 0.05 dL/g, or within 0.030 dL/g, or within 0.02 of the It.V., or within 0.015 dL/g, obtained upon solidification. For example, the polyester melt may have an It.V. that is about 0.10 dL/g below the It.V. obtained upon solidification, or it could have an It.V. that is about 0.10 dL/g above the It.V. obtained upon solidification.

In yet another aspect, the deactivator is added to the polyester melt at a point within about 30 minutes or less, or within 20 minutes or less, or within 10 minutes or less, or 5 minutes or less, or 3 minutes or less of solidifying the polyester melt. The solidification of the polyester melt typically occurs when the melt is forced through a die plate into a water bath and cut into pellets, or in a melt-to-mold process when the melt is injection molded into a molded article. In the broadest sense, solidification occurs when the temperature of the polymer melt is cooled below the crystalline melting temperature of the polymer.

In yet another aspect, each of the aspects identified herein occurs individually or in combination in, for example, a continuous commercial manufacturing process where the throughput of the melt phase process is at least 1 metric ton/day, or at least 50 metric tons/day, or at least 100 metric tons/day, or at least 200 metric tons/day, or at least 300 metric tons/day, or at least 400 metric tons/day, or at least 500 metric tons/day of polyester polymer in a steady state operation.

The reaction time of the melt from an It.V. of about 0.40 dL/g through and up to an It.V. in the range of at least about 0.68 dL/g to about 0.94 dL/g is preferably about 240 minutes or less, 210 minutes or less, or 180 minutes or less, or 150 minutes or less, or 120 minutes or less, or 90 minutes or less, or 50 minutes or less. During the times stated, the vacuum applied is, for example, between about 0.5 and about 1.0 mm Hg, the temperature is between, for example, about 275° C. to about 285° C. In one aspect, the target It.V. is between about 0.82 and about 0.92 dL/g prior to catalyst deactivation. This aspect is combinable with any of the other aspects described herein.

The quantity of phosphorus compound or other catalyst deactivator used in this process is effective to lower the amount of free AA generated upon melting the solid polyester polymer particles produced in the melt phase by partially or fully deactivating the catalytic activity of the titanium compound residues. The amount of free AA generated upon melting the solid polyester particles that can be tolerated depends on the end-use application and often on the particular beverage brand owner involved. Preforms used to make water bottles often have lower free AA specifications than preforms used to make bottles for carbonated soft drinks (CSD). For example, the maximum acceptable level of free AA in CSD preforms may be about 9 ppm, while the maximum acceptable level of free AA in some water preforms may be about 3 ppm. Preforms intended for use in both CSD and water markets, dual-use preforms, often have AA specifications similar to preforms used solely in the water market. The quantity of phosphorus compound or other catalyst deactivator used in the inventive polyester polymer depends on the end-use application and/or beverage brand owner involved. For example, the targeted phosphorus to titanium mole ratio, or phosphorus level in PET for a given Ti level, may be higher for water or dual-use applications than for CSD applications. Since late addition of catalyst deactivator can cause It.V. loss, the minimum amount of deactivator possible should be added to achieve the targeted free AA level in the part for a given application. The It.V. loss from late addition of 85% phosphoric acid is greater than that from a neat phosphate triester. From a practical standpoint, It.V. loss has a negative impact on production rate. In addition, at some point, the It.V. loss may start interfering with the AA benefit as a lower It.V. means more hydroxyethyl end groups that can react with certain AA precursors to form AA.

If the deactivator is corrosive, it is especially critical that the minimum amount of deactivator possible should be added to achieve the targeted free AA level in the part for a given application. In some cases, a neutral compound, like a phosphate triester, is preferred over an acidic compound, like phosphoric acid, given equal effectiveness at lowering free AA. For example, large quantities of phosphoric acid may promote corrosion of pumps, and reactor vessels if the equipment does not have the proper metallurgy, such as titanium or Hastalloy. On the other hand, phosphoric acid may be more economical to use, even with the corrosion precautions, and may result in polymer with better sensory properties.

The quantity of phosphorus added late relative to the titanium atoms used in this process is not limited, but consideration is taken for the amount of titanium metal and other metals present in the melt. Compounds of metals other than titanium also react with phosphorus compounds. If, in addition to titanium compounds, other metal compounds that react with phosphorus compounds are present, then the amount of phosphorus compound added late is desirably in excess of that required to achieve the targeted P:Ti MR to ensure that the phosphorus compounds react or combine with all reactive metals present. The ratio of moles of phosphorus atoms to moles of titanium atoms is desirably at least 0.15:1, or at least 0.3:1, or at least 0.5:1, or at least 0.7:1, or at least 1:1, or at least 2:1.

Although we have found that a P:Ti MR of 25 is suitable, and no upper bound is specified, large excesses of a phosphorus compound may cause excessive It.V. loss. From a practical standpoint, It.V. loss has a negative impact on production rate. Larger It.V. losses due to high levels catalyst deactivator require more It.V. to be built prior to addition of the catalyst deactivator. At some point, the It.V. loss may start interfering with the AA benefit as a lower It.V. means more hydroxyethyl end groups that can react with certain AA precursors to form AA.

At the point just prior to late addition of a phosphorus compound, it is preferred that the phosphorus to titanium mole ratio in the polymer be as low as possible. This preference imparts the maximum AA benefit. A nonzero phosphorus to titanium mole ratio in the polymer at the point prior to late addition of a phosphorus compound may still result in a lowering of AA; however, the rate of decrease in AA with increasing late phosphorus level will be slower and the maximum decrease in AA will be smaller, especially as the level of phosphorus added early increases. That being said, the ranges of phosphorus to titanium mole ratios stated above are formulated in the case where the phosphorus to titanium mole ratio in the polymer prior to the late addition of a phosphorus compound is less than 0.1:1 MR of P:Ti, or less than 0.05:1 MR, or less than 0.01:1 MR, or less than 0.005:1 MR, or close to zero or zero, of P and Ti added to the polycondensation reaction, and preferably of the P and Ti added to the melt phase process (which includes esterification or ester exchange reactions).

It is desirable to add the catalyst deactivator neat, that is, without further dilution, such as in the case of 85% or more phosphoric acid. In this aspect, the It.V. loss due to the reaction between the catalyst deactivator solvent or diluent and the polyester polymer melt may be reduced. Alternatively, if a carrier is used to provide a more dilute solution of catalyst deactivator, it is preferred that that the carrier is nonreactive, that is, does not break the molecular weight polyester polymer melt nor increase AA generation rates. Water, alcohols, glycols and lower molecular weight PET are known to break the polymer chain. In the event that the catalyst deactivator is introduced with a diluent or solvent that is reactive, once the minimum amount of the catalyst deactivator and the associated It.V. loss are known, the melt-phase process can be carried out such that the It.V. made before the catalyst deactivation, is higher by the amount of It.V. loss expected so that the target ItV. can be achieved.

Once the polymer molecular weight is built to the desired degree, it is discharged from the final polycondensation reactor, in this case a finisher, to be pelletized. A gear pump may be utilized to facilitate funneling an amount of bulk polymer through a conduit to exit from finishing vessel. Prior to cutting the molten polymer, and in another aspect of the invention, prior to exiting the melt phase final reactor, it may be desirable to combine the bulk polymer in the melt phase with a second stream that is a liquid (which includes a molten stream, dispersions, emulsions, homogeneous liquids, and heterogeneous slurries). In one aspect, the second stream may be introduced into the melt phase process at any stage prior to solidification, for example, between the entry into the final bulk polymer reactor (such as the final polycondensation reactor also known as the finisher) and the cutter. In another aspect, the second stream may be introduced after the last half of the residence time within the final reactor and before the cutter. In still another aspect, the catalyst deactivator may be added to the second stream then the treated second stream introduced the bulk polyester polymer melt.

The manner in which the second stream is introduced and the source of the second liquid stream is not limited. For example, it may it may be desirable to treat and additionally process a portion of a slip stream. In one aspect, a slip stream of polymer melt may be withdrawn from the polyester polymer melt as the melt is discharged from the final reactor prior to solidification. The catalyst deactivator may then be added to the slip stream and the treated slip stream (a.k.a., the second stream) then circulated back to the final reactor upstream from the point the polyester polymer melt is discharged from the final reactor. In another aspect, it may be desirable to introduce a second stream into the finisher through an extruder or a pumping means from a source independent from or other than the bulk polymer produced in the melt phase process (e.g., a second polymerization reactor.)

Immediately following the finishing reactor and before pelletization, the phosphorus containing compound of the invention may be added to molten polyester and blended with a static mixer or any effective mixing apparatus. Alternatively, the phosphorus containing compound may be added near the end of the finisher reactor. In either case, the phosphorus containing compound may be added neat (without dilution), in a slip stream of molten polyester, as a master batch in polyester pellets (i.e., a concentrate) or in a liquid carrier. The polyesters according to the present invention can be used in forming a variety of articles including sheets, films, tubing, profiles, preforms, fibers, woven and shaped articles, such as containers, and thermoformed articles such as trays and the like.

In another aspect, the catalyst deactivator and other compounds such as UV inhibitors, colorants, reheat additives may be added into a slipstream taken from the polyester melt stream exiting the final polycondensation reactor and the treated melt stream recirculated back into the final reactor or at a point before the slipstream is taken from the melt phase stream exiting the final reactor. Any one or a mixture of these additives may be contained in the second liquid stream.

The additives including the catalyst deactivator may be added to the molten bulk polymer stream via a slipstream or introduced from a fresh source as described above. Additionally or alternatively, a solid additive may be added from a solid additive supply vessel to the slip stream. Additional processing equipment, such as an extruder, may be employed to facilitate mixing the solid additive into slip stream. The extruder may also serve to provide an additional amount of mixing to the slip stream. The extruder may be in line with the slipstream, or may intersect into the slipstream. One or more optional gear pumps may also be employed to provide motive force to the slip stream as it is enriched with one or more additives. Optionally, one or more static mixers in line with the slipstream line may be employed to process the slip stream to provide an additional degree of mixing as desired. Thus, a treated portion or additive enriched polymer slip stream may be generated and returned to the finishing tank for reintroduction into the bulk polymer flow. If desired, the additive rich, or catalyst deactivator containing second stream may be returned to the finisher tank and distributed therein in any suitable manner.

Deactivating the catalyst late or near the end of a melt phase process can result in polyester particles that, in the absence of adding an AA scavenger (e.g., a polyamide AA scavenger) to the melt phase process (which includes esterification and polycondensation), generate less AA during subsequent melt processing than the particles would if the catalyst deactivator had not been added. With late addition of a phosphorus compound, titanium catalyst systems can produce polyester polymer particles with lower AA generation rates than polyester polymers made without the presence of a catalyst deactivator or polyesters made with conventional antimony catalysts that are or are not similarly deactivated late with a phosphorus compound. Molded parts, such as preforms, may have lower free acetaldehyde levels when made from polyester polymers catalyzed by titanium catalyst systems and with a phosphorus compound added late than when made from polyester polymers catalyzed by the same system but with no late addition of a phosphorus compound or when made from polyester polymers catalyzed by a conventional antimony catalyst that is or is not similarly deactivated late with a phosphorus compound. With late addition of a phosphorus compound to the polyester melt catalyzed with an titanium system, it is now possible to obtain a polyester polymer particles having low free AA levels and an AA generation rate low enough for use in water bottle applications without the need to add AA scavengers or other AA lowering additives.

In another aspect, there is provided polyester particles and processes for making such polyester particles wherein the polyester polymer melt exiting the melt phase only polymerization process is not treated with a catalyst deactivator or catalyst deactivation step prior to solidification. In this aspect, the solid, untreated polyester particles obtained from the cutters or particulators is discharged from the final polymer reactor, pelletized, and the catalyst deactivator added to the solidified polyester polymer particles during a subsequent melt processing step (e.g., as a feed into the injection molding machine used to melt and extrude the polyester polymer particles into a bottle preform.)

In another aspect of the invention, the polyester polymer is treated with a catalyst deactivator prior to solidification and is not treated after solidification with a process step, or with a compound, or with a polymer, or any combination thereof, to deactivate the catalyst, such as submerging the polyester polymer particles in, or exposing to, hot water at a temperature and for a time effective to deactivate the catalyst after a step of solidification from the melt phase stage for making the polymer. For example, after the polyester polymer is granulated, whether by conventional techniques or by an underwater cutting technique, and the polymer granules are separated from the water in the granulation process and isolated, the polyester polymer solids are not subjected to a hot water treatment, such as at 60° C. or more for 30 minutes or more. Since the catalyst is deactivated in the melt phase process through the addition of a catalyst deactivator (e.g., a phosphorus compound) to the polyester polymer melt, there is no need for further treating the polyester polymer after solidification to deactivate the catalyst.

It is to be understood that the melt phase process conditions and reactor configurations described above are illustrative of a melt phase process, and that the invention is not limited to this illustrative process. For example, while reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone. Nor is it necessary to split the polycondensation reaction into a prepolymer zone and a finishing zone because the polycondensation reaction can take place in one polycondensation reactor with variations in operating conditions over time or in a multitude of reactors in series, either in a batch, semi-batch, or a continuous process.

Once the polymer molecular weight is built to the desired degree, the molten polyester polymer in the melt phase reactors is discharged as a melt phase product and solidified without the addition of an acetaldehyde scavenger to the polymer melt. Avoiding the addition of acetaldehyde scavengers is desirable because acetaldehyde scavengers are costly and may be responsible for increasing the b* color of the polyester polymer or decreasing its L* color after toning out yellow, especially when the reaction product of free AA and the scavenger is colored. If the AA scavenger has thermal stability or volatility issues, the effectiveness of a given amount of scavenger at lowering free AA may suffer when the scavenger is added in the finisher in a polycondensation zone where high heat and high vacuum are applied. Some AA scavengers increase the amount of black specks in the solid polyester particles and/or in subsequently molded parts.

An acetaldehyde (AA) scavenger is a compound or polymer which interacts by physical forces to bind acetaldehyde and prevent its release from the polyester polymer or by chemical reaction with acetaldehyde to convert acetaldehyde into another compound(s). Rather than preventing the formation of acetaldehyde precursors or the subsequent reactions of the precursors to form free AA, the scavengers operate by binding to free acetaldehyde or by converting it into another compound(s). The net effect is that the acetaldehyde is no longer present or no longer available to migrate out of a solid polyester particle or molded part.

Acetaldehyde scavengers are known to those of skill in the art. Examples include polyamides such as those disclosed in U.S. Pat. No. 5,266,413, U.S. Pat. No. 5,258,233, U.S. Pat. No. 4,837,115, and U.S. Pat. No. 5,650,469; polyesteramides such as those disclosed in U.S. application Ser. No. 595, 460, filed Feb. 5, 1996; nylon-6 and other aliphatic polyamides such as those disclosed in Japan Patent Application Sho 62-182065 (1987); ethylenediaminetetraacetic acid (U.S. Pat. No. 4,357,461), alkoxylated polyols (U.S. Pat. No. 5,250, 333), bis(4-[bgr]-hydroxyethoxyphenyl)sulfone (U.S. Pat. No. 4,330,661), zeolite compounds (U.S. Pat. No. 5,104, 965), 5-hydroxyisophthalic acid (U.S. Pat. No. 4,093,593), supercritical carbon dioxide (U.S. Pat. No. 5,049,647 and U.S. Pat. No. 4,764,323) and protonic acid catalysts (U.S. Pat. No. 4,447,595 and U.S. Pat. No. 4,424,337), and the most well known acetaldehyde scavengers are homo and copolyamides such as poly(caprolactam), poly(hexamethylene-adipamide), poly(m-xylylene-adipamide), and any other compound or polymer having an active methylene group.

Some AA scavengers cause a yellowing of the polyester polymers and of the bottles, containers, or films produced from the polyester polymers. For example, polyamide homopolymers or copolymers including those described, for example, in U.S. Pat. No. 5,258,233, U.S. Pat. No. 5,650,469, U.S. Pat. No. 5,021,515, U.S. Pat. Appln. Publication No. 2006/0148957, and U.S. Pat. Appln. Publication No. 2006/ 0180790, incorporated herein by reference in their entirety, are AA scavengers and may impart a yellow color to polyester polymers when incorporated in the polyester polymer and exposed to melt polyester polymer processing temperatures. Such one or more polyamide homopolymers or copolymers may be described herein simply as "polyamide AA scavengers."

The term "polyamide AA scavenger" is used herein generally, and includes those that are homopolymers, copolymers, and terpolymers, and may be prepared by reacting a carboxylic acid functionalized monomer (e.g., a dicarboxylic acid compound) with an amine functionalized monomer (e.g., a diamine compound), or by any other known method, such as through lactams, using amino acids, or acid chlorides reacted with diamines, to form a polymer comprising predominantly amide linkages between the monomer residues. The polyamide is typically a random polymer such that the monomer units in the polymer chain are randomly arranged rather than arranged in a block fashion. "Polyamide AA scavenger" as used herein also includes low molecular weight polyamides and oligomers, and may comprise, for example, a dicarboxylic acid monomer condensed or end-capped with two monofunctional amine monomers. Similarly, the term "polyamide AA scavenger" may also describe low molecular weight polyamides comprising a diamine monomer condensed, or end-capped, with two monofunctional carboxylic acid monomers.

As used herein, the "carboxylic acid monomer" is typically a dicarboxylic acid monomer, but may also be monomers of other degrees of functionality. For example, the carboxylic acid monomers may include, in addition to or instead of the dicarboxylic acid monomers, monofunctional carboxylic acid monomers used, for example, to end-cap the polyamide AA scavenger, thereby affecting properties of the polyamide AA scavenger, such as the molecular weight and dispersion in the polymer blend. Monomers functionalized with more than two carboxylic acid groups my also be condensed into the polyamide.

Likewise, the "amine monomer" is typically a diamine monomer, but may also be monomers of other degrees of functionality. For example, the amine component may include, in addition to or instead of diamine monomers, monofunctional amine monomers used, for example, to end-cap the polyamide AA scavenger, thereby affecting properties of the polyamide AA scavenger, such as the molecular weight and dispersion in the polymer blend. Monomers functionalized with more than two amine groups may also be condensed into the polyamide AA scavenger to impart cross-linking.

In one aspect, the polyamide AA scavenger is a reaction product containing amide moieties, preferably in an amount of at least 50%, or at least 70%, or at least 80% of the linkages, represented by the general formula:

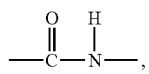

based on the total number of condensation linkages between the monomer residues comprising 100 percent. In another aspect, at least 80%, or at least 90%, or at least 95%, or at least 98% of the linkages between different monomer residues in the polyamide polymer are amide linkages, based on the total number of linkages comprising 100 percent. The number of such amide linkages present in the polymer may range, for example, from about 1 to about 200, or from about 50 to about 150.

In another aspect, the polyamide AA scavenger contains active methylene groups, such as may be found when a methylene group is resonance stabilized by an adjacent $sp^2$ type carbon atom. Active methylene groups include, for example, allylic group hydrogens and benzylic group hydrogens, including those present in the following structure linked to the carbon illustrated in bold:

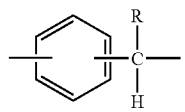

wherein R is a hydrogen or an alkyl group. The benzylic position is thus a carbon directly attached to an aryl ring. This carbon is especially reactive due to resonance stabilization of a benzylic radical or cation by the adjacent $sp^2$ carbon in the aryl ring. The aryl ring may be, for example, a phenyl ring or another polycyclic aromatic ring such as naphthyl. Preferably, at least 50% of the amine residues contain an active methylene group, such as an allylic group, an oxyalkylene hydrogen, or more preferably at least 50% of the amine residues contain a benzylic hydrogen group.

In yet another aspect, the polyamides AA scavergers comprise residues of adipic acid and m-xylylene diamine. In one aspect, the polyamide AA scavengers according to the invention may comprise adipic acid residues in amounts, for example, of at least about 50 mole %, or at least 60 mole %, or at least 70 mole %, or at least 80 mole %, up to about 85 mole %, or up to 90 mole %, or up to 95 mole %, or up to 98 mole %, or up to 100 mole %, based on the total carboxylic acid residues in the polyamide summing to 100 mole.

In another aspect, polyamide AA scavengers comprise m-xylylene diamine residues in amounts, for example, of at least about 50 mole %, or at least 60 mole %, or at least 70 mole %, or at least 80 mole %, up to about 85 mole %, or up to 90 mole %, or up to 95 mole %, or up to 98 mole %, or up to 100 mole %, in each case based on the total amine residues in the polyamide comprising 100 mole %, with the remainder of the amine residues comprising residues from one or more other amines, such as p-xylylenediamine.

In yet another aspect, the polyamide AA scavengers may include a copolymer comprising from about 80 to 100 mol percent adipic acid residues and from about 80 to 100 mole percent m-xylylenediamine residues, based on the total amount of carboxylic acid residues and the total amount of amine residues in the polyamide each comprising 100 mole percent. In still another aspect, the polyamide AA scavengers comprise from about 95 to 100 mole percent adipic acid residues and from about 90 to 100 mole percent m-xylylenediamine residues, based on the total amount of carboxylic acid residues and the total amount of amine residues in the polyamide AA scavenger each comprising 100 mole percent. In another aspect, the polyamide AA scavenger may comprise repeating units of poly(m-xylylene adipamide) in an amount of at least 60 mole percent, or at least 75 mole percent, or at least 80 mole percent, or at least 85 mole percent, or at least 90 mole percent, or at least 95 mole percent, or at least 96 mole percent, in each case based on the total moles of acid/amine units in the polyamide comprising 100 mole percent.

In addition to adipic acid residues, the carboxylic acid residues of the polyamide AA scavengers may comprise, for example, up to 20 mole percent, or up to 10 mole percent, or up to 5 mole percent, or up to 2 mole percent, one or more additional carboxylic acid residues having, for example, from 2 to 20 carbon atoms, for example one or more aliphatic carboxylic acid residues having from 7-12 carbon atoms, such as residues of pimelic acid, suberic acid, azelaic acid, sebacic acid, undecandioic acid, dodecandioic acid, or 1,4-cyclohexanedicarboxylic acid. In other aspects, the carboxylic acid residues may comprise isophthalic acid, or terephthalic acid residues.

The amine residues of the polyamide AA scavengers may include up to 20 mole percent, or up to 10 mole percent, or up to 5 mole percent, of one or more additional amine residues having from 2 to 16 carbon atoms. Examples include p-xylylene diamine, 1,2-bisaminomethylcyclohexane, hexamethylene diamine, and mixtures thereof.

It is to be understood that the amine monomer used to prepare the polyamides AA scavengers may not be 100% pure, and may contain reaction by-products with the identified amine monomer being the predominant monomer. The same can be said for the carboxylic acid monomer.

The polyamides AA scavengers of the invention may further comprise additional linkages, for example imides and amidines.

Polyamides AA scavengers include, for example,
(a) a dicarboxylic acid residues of adipic acid in an amount of at least about 50 mole %, or at least 60 mole %, or at least 70 mole %, or at least 80 mole %, up to about 85 mole %, or up to 90 mole %, or up to 95 mole %, or up to 98 mole %, or up to 100 mole % with the remainder of the dicarboxylic acid residues comprising residues of, for example, isophthalic acid or terephathalic acid up to 5 mole %, or up to 40 mole %, or up to 30 mole %, or up to 20 mole %, or up to 10 mole %, or up to 5 mole %, and mixtures thereof, in each case based on the total dicarboxylic acid residues in the polyamide summing to 100 mole, and
(b) a diamine residue comprising residues of m-xylylene diamine in amounts, for example, of at least about 50 mole %, or at least 60 mole %, or at least 70 mole %, or at least 80 mole %, up to about 85 mole %, or up to 90 mole %, or up to 95 mole %, or up to 98 mole %, or up to 100 mole %, with the remainder of the diamine residues comprising residues from one or more other diamines, such as p-xylylenediamine or hexamethylene diamine residues in an amount up to 50 mole %, or up to 40 mole %, or up to 30 mole %, or up to 20 mole %, or up to 10 mole %, or up to 5 mole %, in each case based on the total diamine residues in the polyamide comprising 100 mole %. Examples include, but are not limited to: poly (m-xylylene adipamide) (which may be described herein as "MXD6"), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide), and the like, or mixtures thereof. Especially suitable polyamides include those having residues with a benzylic hydrogen, for example polyamides such as poly(m-xylylene adipamide), poly(m-xylylene isophthalamide-co-terephthalamide), poly(m-xylylene adipamide-co-isophthalamide), and mixtures thereof The number average molecular weight of the polyamide AA scavenger is not particularly limited. The number average molecular weight (Mn) may be, for example, at least about 1,000, up to, for example, about 45,000. Alternatively, the Mn of the polyamide polymer may be at least 2,500, or at least 3,500, or at least 5000, up to about 7,000, or up to about 12,000, or up to about 25,000. If desired, low molecular weight polyamides may be used in the range from about 200, or from 300, or from 500, or from 1,000 up to about 12,000, or from 2,000 to 10,000, or from 2,500 to 7,000. If optical clarity of the polymer blend is important, we believe that the use of low molecular weight polyamides may interfere less with light transmission.

The polyamide AA scavengers include those described in U.S. Pat. Appln. Publn. No. 2006/0180790, incorporated herein by reference in its entirety. For example, the polyamide AA scavengers may comprise adipic acid condensed with two monofunctional or difunctional amines, for example having a benzylic hydrogen, such as from a benzyl amine. The monomers may be the same or different. Alternatively, the low molecular weight polyamides may comprise m-xylylenediamine condensed with two monofunctional or difunctional monomers such as carboxylic acids (e.g., formic, acetic, propionic, butyric, valeric acid, benzoic) or an acid chloride. The monomers can be the same or different. The molecular weight of such molecules will depend in part upon whether the monomers are monofunctional or difunctional, that is, whether the monomers include linking groups to further react with additional monomers.

In one aspect of the invention, the polyester polymer composition may be devoid of a polyamide which is effective to scavenge AA added during the melt phase polymerization prior to solidification, or which is added at any point prior to placing the polyester polymer in a shipping container, or which is added at any point prior to remelting the composition to form an article, and in another aspect, the polyester composition is devoid of any polymer added during melt phase prior to solidification which is effective to scavenge AA.

The melt phase product is processed to a desired form, such as amorphous particles. The shape of the polyester polymer particles is not limited, and can include regular or irregular shaped discrete particles without limitation on their dimensions, including stars, spheres, spheroids, globoids, cylindrically shaped pellets, conventional pellets, pastilles, and any other shape, but particles are distinguished from a sheet, film, preforms, strands or fibers.

The number average weight (not to be confused with the number average molecular weight) of the particles is not particularly limited. For example, the particles may have a number average weight of at least 0.10 g per 100 particles, or greater than 1.0 g per 100 particles, and up to about 100 g per 100 particles.

The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus may be used, including but not limited to dicing, strand pelletizing and strand (forced conveyance) pelletizing, pastillators, water ring pelletizers, hot face pelletizers, underwater pelletizers and centrifuged pelletizers.

The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized.

A preferred solidification technique integrates the cutting with the crystallization by not allowing the heat energy imparted to the polymer in the melt phase manufacture to drop below the $T_g$ before the polymer is both cut and crystallized to at least 20% degree of crystallinity. In one integrated solidification technique, the molten polyester polymer is directed through a die, cut at the die plate under water at high temperature and greater than atmospheric pressure, swept away from the cutter by the hot water and through a series of pipes to provide residence time to thermally crystallize the particles in the hot liquid water at a temperature greater than the $T_g$ of the polymer and preferably at about 130 to 180° C., after which the water is separated from the crystallized particles and the particles are dried. In another integrated solidification technique, the molten polyester polymer is cut underwater, the particles are immediately separated from the liquid water after cutting, the particles are dried, and while the particles are still hot and before the temperature of the particles drops below the $T_g$ of the polymer and desirably while the particle temperature is above 140° C., the particles are directed from the dryer onto a surface or vessel which allows the particles to form a moving bed with a bed height sufficient to allow the latent heat within the particles to crystallize the particles, preferably without the external application of a heating medium or pressurizing means. This technique is also known as latent heat crystallization, and the process is commercially available from Brookman Kreyenborg GmbH.

The degree of crystallinity is optionally at least 30%, or at least 35%, or at least 40%. In a direct esterification process, the melt phase products are preferably prepared by adding to the melt phase a polycondensation catalyst consisting only of titanium containing compound(s). Thus, polyester polymers made in the melt phase having a low or acceptable AA generation rate can be isolated and provided to a converter without the need for increasing their molecular weight in the solid state. By making the high It.V. product in the melt phase, the solid stating step can be altogether avoided. Solid stating is commonly used for increasing the molecular weight (and the It.V) of the pellets in the solid state, usually by at least 0.05 It.V. units, and more typically from 0.1 to 0.5 It.V. units.

For application requiring very low fee AA (e.g., less that about 3 ppm), the polyester polymer particles produced using the melt phase only process of the invention may require removal of excess free AA. In one aspect, polyester polymer particles having a very low level of free acetaldehyde (e.g., less than 3 ppm) are obtained by a post-melt-phase-polycondensation elimination of residual acetaldehyde. Thus, once particles are obtained from the melt phase production process, the residual acetaldehyde present in the particles is reduced by conventional means or by a means as described below. The amount of residual acetaldehyde in the solid particles is reduced by techniques other than solid state polymerization processes which are expensive and result in significant molecular weight advancement. Desirably, the residual acetaldehyde in the solid particles is reduced in the solid state to a level of about 10 ppm or less, or 8 ppm or less, or 6 ppm or less, or 4 ppm or less without increasing the It.V. of the particles by more than 0.03 dL/g. In this aspect, the particles are not remelted and devolatized in order to reduce their level of acetaldehyde, nor are the particles subjected to solid state polymerization techniques which result in advancing the It.V. of the particles more than about 0.03 dL/g. In still another aspect, the level of residual acetaldehyde in the solid particles is reduced to a level of about 5 ppm or less. In yet another aspect, the level of residual acetaldehyde in the solid particles is reduced to a level of 2 ppm or less.

Any conventional technique for reducing the acetaldehyde in the particles is suitable, preferably other than solid state polymerization techniques or other than by remelting/devolatization or other than the addition of a polyamide, or the addition of a polymeric AA scavenger or other substance which binds AA. Thus, the polyester polymer composition may have an AA content of 10 ppm without application of solid state polymerization techniques, and prior to remelting, and without the addition of a polyamide, or a polymeric AA scavenger, or other substance which bind AA, or without any of the foregoing. For example, the vacuum procedure described as part of the sample preparation for the AA generation rate test would be suitable; however, on a larger scale, a vessel would replace the oven.

Another technique to reduce the level of acetaldehyde in solid particles without advancing their molecular weight beyond 0.03 dL/g is referred to herein as acetaldehyde stripping as described in US2006/0047103, incorporated herein by reference in its entirety. By this method, the residual acetaldehyde of the particles is reduced by introducing the particles into a vessel to form a bed of particles within the vessel, and contacting the bed with a stream of gas introduced at a gas flow rate not exceeding 0.15 SCFM per pound of particles per hour, and withdrawing finished particles from the vessel having a reduced amount of residual acetaldehyde.

In a gas stripping operation, a gas such as air or an inert gas such as nitrogen is contacted with the polyester polymer particles either co-current or countercurrent, preferably countercurrent to the flow of the particles in a vessel in a continuous or batchwise process, preferably a continuous process. The temperature of the gas introduced into the AA stripping vessel is not particularly limited, and can range from ambient to about 180° C., but preferably from ambient to about 70° C., or up to 50° C., or up to 40° C., or about ambient. The temperature of the gas exiting the stripping vessel will approximate the temperature of the pellets introduced into the vessel. Thus, if particles are introduced at 100° C., the exit temperature of the gas will be about 100° C.±20° C. The temperature of the gas exiting the vessel should not exceed a temperature at which the molecular weight of the particles is advanced in the solid state by more than about 0.03 dL/g. The residence time of the particles depends on the starting level of residual AA, the gas temperature and particle mass/gas ratio, but in general, the residence time ranges from 0.5 hour to 30 hours. The gas composition may include, for example, nitrogen, carbon dioxide, or ambient air. If considerable IV loss occurs and/or the color of the solid polyester particles worsens significantly upon stripping in air at a given temperature, using nitrogen or another inert gas as the gas composition may be preferable. In another aspect, air may be used at a lower stripping temperature. The gas does not need to be dried, since the function of the gas is not to dry the pellets but to strip residual AA from the pellets. If desired, however, the gas may be dried.

Dryer temperature, gas flow, desiccant type and residence time will impact the efficacy of AA stripping in the dryer feeding the extruder for making an article. While gas stripping of acetaldehyde may also occur in the dryer feeding the extruder for making an article, it is preferred to feed the dryer with polymer particles already having 2 ppm or less of residual acetaldehyde in order to reduce the gas flow used in the dryer and/or improve the quality of the articles made from the extruder. Moreover, in an AA stripping process, dry gas is not required to strip the AA from the particles, whereas in a drying process, a stream of dried air is circulated through the particles primarily to reduce the moisture on or in the particles with the secondary advantage of also removing AA. Thus, in an AA stripping process, ambient gas can be and preferably is used as the stripping medium.

Thus, in one aspect, the particles of the invention having an It.V. of at least 0.069 dL/g and a degree of crystallinity within a range of, for example, about 20% to about 55% and having a residual acetaldehyde level of, for example, at least about 3 ppm, or greater than 10 ppm, or greater than 20 ppm, or greater than 30 ppm, or greater than 40 ppm are fed to a vessel, preferably through the upper end of a vessel, as hot particles (e.g., about 100° C. to about 180° C.) to increase the efficiency of AA stripping. The hot particles form a bed of pellets flowing by gravity toward the bottom end of the vessel while a countercurrent flow of gas such as ambient air or nitrogen is circulated through the bed, said gas introduced into the vessel at a temperature ranging from about ambient conditions to about 70° C., or from about ambient to about 40° C., to thereby reduce the level of residual AA in and/or on the particles introduced into the vessel. The particles are withdrawn from the vessel within about 0.5 to 30 hours of their introduction into the countercurrent stream of gas. While the vessel can be pressurized, it is preferably not pressurized except by the pressure created from the gas flow. The vessel is desirably operated at about 0-5 psig, or ambient pressure.

The level of residual acetaldehyde present on the stripped particles, that is, on the particles exiting the stripping process, is, for example, about 10 ppm or less, or 7 ppm or less, or 5 ppm or less, or 3 ppm or less, or 2 ppm or less, or 1.5 ppm or less. The level of residual acetaldehyde present on the particles fed to the stripping vessel after being obtained from the melt phase polycondensation is generally about 3 ppm or more, or at least 5 ppm, or at least 10 ppm, or at least 20 ppm, or at least 25 ppm, or at least 30 ppm, or at least 40 ppm. In another aspect, the difference in the free acetaldehyde levels of the pellets entering the stripping vessel and those exiting the vessel is, for example at least about 5 ppm, or at least 10 ppm, or at least 20 ppm or more, or at least 30 ppm or more.

The gas can be introduced into the vessel by any conventional means, such as by a blower, fans, pumps, and the like. The gas may flow co-current to or countercurrent to or across the flow of particles through the vessel. The preferred flow of gas through the bed of particles is countercurrent to the particle flow through the bed. The gas can be introduced at any desired point on the vessel effective to lower the level of acetaldehyde in the particles exiting the vessel as compared to those fed to the vessel. Preferably, the gas introduction point is to the lower half of the bed height in the vessel, and more preferably to the lower ¼ of the bed height. The gas flows through at least a portion of the particle bed, preferably through at least 50 volume % of the bed, more preferably through at least 75% of the particle bed volume. Gas suitable for use in the invention may be, for example, air, carbon dioxide, and nitrogen. Some gases are more preferred than others due to the ready availability and low cost. For example, the use of air rather than nitrogen would lead to significant operating cost improvements. It was believed that the use of nitrogen gas was required in operations which pass a hot flow of gas through a bed of particles at temperatures above 180° C., such as in a preheater or solid-stater, because nitrogen is inert to the oxidative reactions, resulting in pellet discoloration, which would otherwise occur between many polyester polymers and the oxygen in ambient air. However, by keeping the process temperature low such that the gas exiting the vessel does not exceed 190° C., particle discoloration is minimized. In one aspect, the gas contains less than about 90 vol % nitrogen, or less than 85 vol % nitrogen, or less than 80 vol % nitrogen. In another aspect, the gas contains oxygen in an amount of 17.5 vol % or more. In another aspect, the use of air at ambient composition (the composition of the air at the plant site on which the vessel is located), or air which is not separated or purified, is preferred. In yet another aspect, ambient air is fed through the gas inlet. While the gas can be dried if desired, it is not necessary to dry the gas since the object is to remove acetaldehyde from the particles.

Any vessel for containing particles and allowing a feed of gas and particles into and out of the vessel is suitable. For example, there is provided a vessel having at least an inlet for gas, and inlet for the polyester polymer particles, an outlet for the gas, and an outlet for the finished particles. The vessel is preferably insulated to retain heat. The gas inlet and the finished particle outlet are desirably located below the gas outlet and the particle inlet, preferably with the gas outlet and particle inlet being toward the top of the vessel and the gas inlet and finished particle outlet being toward the bottom of the vessel. The gas is desirably introduced into the bed within the vessel at about ½ or more desirably at about the lower ¼ of the bed height within the vessel. The particles are preferably introduced at the top of the vessel, and moved by gravity to the bottom of the vessel, while the gas preferably flows countercurrent to the direction of the particle flow. The particles accumulate within the vessel to form a bed of particles, and the particles slowly descend down the length of the vessel by gravity to the finished particle outlet at the bottom of the vessel. The bed height is not limited, but is preferably at a substantially constant height in a continuous process and is at least 75% of the height of the vessel containing the particles within the stripping zone. The vessel preferably has an aspect ratio L/D of at least about 2, or at least 4, or at least 6. While the process can be conducted in a batch or semi batch mode in which as the particles would not flow and the stream of gas can be passed through the bed of particles in any direction, the process is preferably continuous in which a stream of particles continuously flows from the particle inlet to the finished particle outlet as the particles are fed to the vessel.

A suitable gas flow rate introduced into the vessel and passing through at least a portion of the particle bed is one which is sufficient to lower the amount of residual acetaldehyde on the particles exiting the vessel as compared to those introduced into the vessel. For example, for every one (1) pound of particles charged to the vessel per hour, suitable gas flow rates introduced into the vessel are at least about 0.0001 standard cubic feet per minute (SCFM), or at least 0.001 SCFM, or at least 0.005 SCFM. High flow rates are also suitable, but not necessary, and the gas flow rate should be kept sufficiently low to avoid unnecessary energy consumption by the gas pumps, fans, or blowers. Moreover, it is not desired to unduly cool the particles or dry the particles because the achievement of either or both of these objectives typically requires the use of high gas flow rates. In addition, if significant cooling occurred, the rate of AA stripping may slow, that is, more time may be required at lower temperatures to achieve the same level of residual AA in the finished particles. The gas flow rate is preferably not any higher than about 0.15 SCFM, or not higher than 0.10 SCFM, or not higher than 0.05 SCFM, or even not higher than 0.01 SCFM for every one (1) pound of charged particles per hour.

Optimal process conditions to minimize oxidation reactions, discoloration, maintain the It.V. of the particles, and remove acetaldehyde while keeping the production costs low are to introduce the gas at ambient temperature, to feed particles within a range of about 150° C. to about 170° C. into a vertical cylindrical vessel at a gas flow rate ranging from about 0.002 SCFM to about 0.009 SCFM per 1 lb/hr of PET. The size of the vessel is such that the residence time of the pellets averages about 10 to about 24 hours.

By utilizing the process of the present invention, polymers with suitably high It.V. may be obtained in relatively short overall process times or in similar process times but at milder temperatures, and produce polyester product, for example in the form of pellets, which not only do not require the expense and increased process time of solid stating, but also contain less AA and generate less AA during future processing. If yet higher It.V. polymers are desired, the molecular weight may be increased further by solid stating. While this additional process step does involve extra time and expense, this is partially compensated by reduction in overall polymerization time in the melt phase. Moreover, solid stating will further reduce the AA content.

In addition, certain agents which colorize the polymer may be added to the melt. In one aspect, a bluing toner is added to the melt in order to reduce the b* of the resulting polyester polymer melt phase product. Such bluing agents include blue inorganic and organic toners. In addition, red toners can also be used to adjust the a* color. Organic toners (e.g., blue and red organic toners) such as those toners described in U.S. Pat. Nos. 5,372,864 and 5,384,377, which are incorporated by reference in their entirety, can be used. The organic toners may be fed as a premix composition. The premix composition may be a neat blend of the red and blue compounds or the composition may be pre-dissolved or slurried in one of the polyester's raw materials (e.g., ethylene glycol.)

The total amount of toner components added depends on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from about 0.5 to about 10 ppm.

The toners can be added to the esterification zone or to the polycondensation zone. In one aspect, the toners are added to the esterification zone or to the early stages of the polycondensation zone, such as to a prepolymerization reactor. This is especially the case if the toners are slurried in ethylene glycol, and if pressures decrease with progression through the polycondensation zone.

The polyester polymers of the invention and bottle preforms made from these polymers may contain a reheat additive thus having an improved reheat rate, expressed as a twenty-ounce bottle preform Reheat Improvement Temperature (RIT), relative to a control sample with no reheat additive. Thus, in various aspects, the twenty-ounce bottle preform reheat improvement temperature (RIT) of the polyester polymers according to the claimed invention containing reheat additives, may be from about 0.1° C. to about 11° C., or from 1° C. to 11° C.

The reheat additive used in the polyester polymer will depend upon the particular application, the desired reduction in reheat time, and the toleration level in the reduction of a* and b* away from zero along with the movement of L* brightness values away from 100. The maximum amount of reheat agent may be limited by one or more of the desired reheat rate, or maintenance in L*, a*, b* and other color properties, which may vary among applications or customer requirements. The impact of a reheat additive on the color of the polyester polymer may be judged using a tristimulus color scale, such as the CIE L*a*b* scale. The L* value ranges from 0 to 100 and measures dark to light. The a* value measures red to green with positive values being red and negative values green. The b* value measures yellow to blue with yellow having positive values and blue negative values.

Color measurement theory and practice are discussed in greater detail in *Principles of Color Technology*, pp. 25-66 by Fred W. Billmeyer, Jr., John Wiley & Sons, New York (1981), incorporated herein by reference.

L* values for the polyester polymers as measured on twenty-ounce bottle preforms should generally be greater than 60, more preferably at least 65, and more preferably yet at least 70. Specifying a particular L* brightness does not imply that a preform having a particular sidewall cross-sectional thickness is actually used, but only that in the event the L* is measured, the polyester polymer actually used is, for purposes of testing and evaluating the L* of the polyester polymer, injection molded to make a preform having a thickness of 0.154 inches.

The color of a desirable polyester polymer, as measured in twenty-ounce bottle preforms having a nominal sidewall cross-sectional thickness of 0.154 inches, is generally indicated by an a* coordinate value preferably ranging from about minus 2.0 to about plus 0.5 or from about minus 2.0 to about plus 0.1. With respect to a b* coordinate value, it is generally desired to make a bottle preform having a b* value coordinate ranging from minus 3.0, or from minus 1.5, to a positive value of less than plus 5.0, or less than plus 4.0, or less than plus 3.8, or less than 2.6.

In yet another aspect of the invention, there is provided a beverage bottle made from a preform comprising the inventive polyester polymer, wherein the preform has a RIT of 5° C. or more, and an L* value of 60 or more.

In yet another aspect of the invention, there is provided a beverage bottle made from a preform comprising the inventive polyester polymer, wherein the preform has a RIT of 5° C. or more, and an L* value of 60 or more.

In various other aspects, there are provided polyester polymers, whether in the form of a melt, pellets, sheets, preforms, and/or bottles, comprises a reheat additive, and wherein the preforms formed from the polyester polymers have a preform L* value of 70 or more, or 79 or more, or even 80 or more, and an RIT of 10° C., or at least 5° C., or at least 3° C.

Reheat additives added in the inventive polyester polymers include, for example activated carbon, carbon black, antimony metal, tin, copper, silver, gold, palladium, platinum, black iron oxide, and the like, as well as near infrared absorbing dyes, including, but not limited to those disclosed in U.S. Pat. No. 6,197,851 which is incorporated herein by reference. In another aspect of the invention, titanium nitride particles may be added as a reheat additive at any point during polymerization of the PET polymers, or afterward, including to the esterification zone, to the polycondensation zone comprised of the prepolymer zone and the finishing zone, to or prior to the pelletizing zone, and at any point between or among these zones. The titanium nitride particles may also be added to solid-stated pellets as they are exiting the solid-stating reactor. Furthermore, the titanium nitride particles may be added to the PET pellets in combination with other feeds to the injection molding machine, or may be fed separately to the injection molding machine. For clarification, the particles may be added in the melt phase or to an injection molding machine without solidifying and isolating the polyester composition into pellets. Thus, the particles can also be added in a melt-to-mold process at any point in the process for making the preforms. In each instance at a point of addition, the particles can be added as a powder neat, or in a liquid, or a polymer concentrate, and can be added to virgin or recycled PET, or added as a polymer concentrate using virgin or recycled PET as the PET polymer carrier.

The iron oxide, which is preferably black, is used in very finely divided form, e.g., from about 0.01 to about 200 μm, preferably from about 0.1 to about 10.0 μm, and most preferably from about 0.2 to about 5.0 μm. Suitable forms of black iron oxide include, but are not limited to magnetite and maghemite. Red iron oxide may also be used. Such oxides are described, for example, on pages 323-349 of Pigment Handbook, Vol. 1, copyright 1973, John Wiley & Sons, Inc.

The specific reheat additive, as well as other additives (e.g., polymers such as polycarbonate and PCR), incorporated into the base polyester polymer of the invention may have a strong influence on the color of the polyester polymers and products formed these inventive polyester polymers. To correct for this color shift, an adjustment in the amount of colorant(s) (also called "toner" herein) may be required to produce a polyester polymers and corresponding products to meet the requirements of the end use application.

Other components can be added to the composition of the present invention to enhance the performance properties of the polyester polymer. For example, crystallization aids, impact modifiers, surface lubricants, denesting agents, antioxidants, ultraviolet light absorbing agents, colorants, nucleating agents, other reheat rate enhancing aids, sticky bottle additives such as talc, and fillers and the like can be included.

The compositions of the present invention optionally may additionally contain one or more UV absorbing compounds of the type disclosed in U.S. Pat. No. 4,617,374 and incorporated by reference in it's entirety herein. One example includes UV absorbing compounds which are covalently bound to the polyester molecule as either a comonomer, a side group, or an end group. Suitable UV absorbing compounds are thermally stable at polyester processing temperatures, absorb in the range of from about 320 nm to about 380 nm, and are difficult to extract or nonextractable from said polyester polymer. The UV absorbing compounds preferably provide less than about 20%, or less than about 10%, transmittance of UV light having a wavelength of 370 nm through a bottle wall 12 mils (305 microns) thick. Suitable chemically reactive UV absorbing compounds include substituted methine compounds of the formula

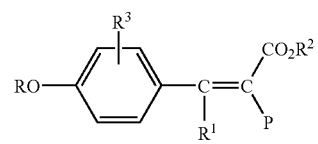

wherein:
R is hydrogen, alkyl, substituted alkyl, aryl, substituted aryl, cycloalkyl, substituted cycloalkyl or alkenyl, or a polyoxyalkylene chain, such as polyoxyethylene or polyoxypropylene polymers, each optionally having some oxypropylene or oxyethylene units in the polymer chain as a block or random copolymer, the polyoxyalkylene chain having a number average molecular weight ranging from 500 to 10,000;

$R^1$ is hydrogen, or a group such as alkyl, aryl, or cycloalkyl, all of which groups may be substituted;

$R^2$ is any radical which does not interfere with condensation with the polyester, such as hydrogen, alkyl, substituted alkyl, allyl, cycloalkyl or aryl;

$R^3$ is hydrogen or 1-3 substituents selected from alkyl, substituted alkyl, alkoxy, substituted alkoxy and halogen, and P is cyano, or a group such as carbamyl, aryl, alkylsulfonyl, arylsulfonyl, heterocyclic, alkanoyl, or aroyl, all of which groups may be substituted.

Preferred methine compounds are those of the above formula wherein: $R^2$ is hydrogen, alkyl, aralkyl, cycloalkyl, cyanoalkyl, alkoxyalkyl, hydroxyalkyl or aryl; R is selected from hydrogen; cycloalkyl; cycloalkyl substituted with one or two of alkyl, alkoxy or halogen; phenyl; phenyl substituted with 1-3 substituents selected from alkyl, alkoxy, halogen, alkanoylamino, or cyano; straight or branched lower alkenyl; straight or branched alkyl and such alkyl substituted with 1-3 substituents selected from the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsufamoyl; vinyl-sulfonyl; acrylamido; sulfamyl; benzoylsulfonicimido; alkylsulfonamido; phenylsulfonamido; alkenylcarbonylamino; groups of the formula

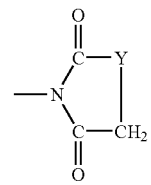

where Y is —NH—, —N-alkyl, —O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl; or groups of the formulae

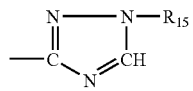

—NHXR$_{16}$, —CONR$_{15}$R$_{15}$, and —SO$_2$NR$_{15}$R$_{15}$;
wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—, and R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1-3 substituents selected from alkyl, alkoxy, or halogen substituents; and
P is cyano, carbamyl, N-alkylcarbamyl, N-alkyl-N-arylcarbamyl, N,N-dialkylcarbamyl, N,N-alkylarylcarbamyl, N-arylcarbamyl, N-cyclo-hexylcarbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl or acyl.

In all of the above definitions the alkyl or divalent aliphatic moieties or portions of the various groups contain from 1-10 carbons, preferably 1-6 carbons, straight or branched chain. Preferred UV absorbing compounds include those where R and R$^1$ are hydrogen, R$^3$ is hydrogen or alkoxy, R$^2$ is alkyl or a substituted alkyl, and P is cyano. In this aspect, a preferred class of substituted alkyl is hydroxy substituted alkyl. A most preferred polyester composition comprises from about 10 to about 700 ppm of the reaction residue of the compound

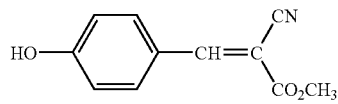

These compounds, their methods of manufacture and incorporation into polyesters are further disclosed in U.S. Pat. No. 4,617,374 the disclosure of which is incorporated herein by reference. The UV absorbing compound(s) may be present in amounts between about 1 to about 5,000 ppm by weight, preferably from about 2 ppm to about 1,500 ppm, and more preferably between about 10 and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The solid particles produced in the melt phase process preferably have an acetaldehyde generation rate, when processed in an extrusion plastometer at 295° C. for 5 minutes, of 20 ppm or less, or 16 ppm or less, or 12 ppm or less or 10 ppm or less, or 8 ppm or less, or 6 ppm or less. The process of the invention does not require melting the particles at 295° C. for 5 minutes to make molded articles. Like all other measurement conditions stated throughout this description, these measurement conditions are not required to be a part of the described feature or property of the polymer or operating condition, and are only stated as a frame or reference to determine whether a polymer does or does not possess the feature, regardless of whether or not the polymer is actually made or processed under the described measurement conditions. The conditions of 295° C. for 5 minutes apply to CEAST or Tinius Olsen extrusion plastometers, which have relatively low shear and do not melt polyester almost instantaneously. Mini-injectors have more shear, melt polyester almost instantaneously, and will require milder conditions to produce about the same level of AA. For example, with same polyester sample, a mini-injector produces higher levels of AA generation after processing at 285° C. for 5 minutes than a CEAST extrusion plastometer does after processing at 295° C. for 5 minutes.

Compared to the particles that have been made with the addition of a catalyst deactivator in step b) omitted, the particles produced by this process preferably have a reduction in AA generation rate of at least about 10% or more, or at least 20% or more, or at least 30% or more, or at least 40% or more, or at least 50% or more, or at least 60% or more. The reduction in AA generation rate is calculated by subtracting the AA generation rate of the particles with step b) from the rate of the particles with step b) omitted and all else being equal, dividing that difference by the rate with step b) omitted, and multiplying by 100.

In another aspect, the level of free AA in articles, such as in a preform (e.g., 20 oz. preform), is about 11 ppm or less, or 9 ppm or less, or 7 ppm or less, or 5 ppm or less, or 4 ppm. With respect to a 20 oz. preform, preforms are molded with an injection molding machine barrel temperature of 275° C. to 290° C., or at about 285° C. and a polymer melt residence time of approximately 2 minutes or less.

Solely for testing purposes on preforms, the injection molding machine is lined out prior to collecting preforms for testing, that is, the first 30 shots are discarded for an eight cavity machine. Twenty successive preforms are collected from a single cavity mold; that is, the one cavity of the eight from which preforms with the highest AA test were historically produced. Of the 20 preforms, five are randomly selected to go in one bag, five more are randomly selected to go into another bag, and 10 are retained for future grinding and retesting, if needed. The convention is to keep preforms in the freezer until they are ground; however, this is not essential. Prior to grinding, the preforms are chilled in liquid nitrogen. The entire preform is ground, per ASTM F2013-00. The five preforms in the first bag are cryogenically ground, and two samples are withdrawn for residual or free AA testing. After grinding, samples should be kept in the freezer until it is time to test free AA. The five preforms in the second bag are cryogenically ground, and two samples are withdrawn for residual or free AA testing. The samples are tested per ASTM F2013-00 and in random order. Each sample is tested twice.

With late addition of a phosphorus compound to the polyester melt catalyzed by a titanium compound, it is now possible to mold a polyester polymer particles into an article, such as a preform, having free AA levels low enough for use in water bottle applications without the need to add AA scavengers or other AA lowering additives. Moreover, this type of polymer particles having both low free AA levels and low AA generation rates without the presence of an AA lowering additive can be polymerized to a high It.V. (at least about 0.69 dL/g, or at least 0.70 dL/g, or at least 0.72 dL/g, or at least 0.74 dL/g, or at least 0.76 dL/g, or at least 0.80 dL/g, or at least 0.82 dL/g or at least 0.84 It.V.) in the melt phase without the necessity for polymerizing the polymer in the solid-state. Furthermore, since this type of polyester particles has an AA generation rate low enough for use in water bottle applications without the need to add AA scavengers and can be polymerized to a high It.V., this type of polyester particles being suitable for dual-use applications: it has the low AA generation rate required for some water bottles and the high It.V. required for CSD bottles; therefore, one type of polyester particle can be used for both applications. While an AA stripping treatment to lower free AA below 3 ppm prior to beginning the injection molding process may be used, this AA stripping process would not be required to remove as much free AA as would be required for Sb-catalyzed PET with a phosphorus compound added late.

The need for and length of the AA stripping process depends on the amount of residual AA present in the polyester polymer particles after melt phase manufacture and on customers' specifications for residual AA in the particles, which may vary depending on the application. The amount of residual AA present in the polyester polymer particles after melt phase manufacture is desirably reduced, for example, to a level of about 5 ppm or less, or 4 ppm or less, or 3 ppm or less, or 2 ppm or less, or 1 ppm or less.

In yet another aspect, the free AA of solid particles fed to a melt zone may be, for example, about 10 ppm or less, or 7 ppm or less, or 5 ppm or less, or 3 ppm or less.

The free AA can be measured on solid particles or preforms.

The method used to determine the level of free AA in the polyester polymer composition is the test method ASTM # F2013-00. This test method is used to measure the level of free acetaldehyde in particles, powders, preforms, bottles, and any other form the polyester polymer composition may take. For purposes of measuring residual or free acetaldehyde, the sample is tested according to the method described below.

The test procedure for measuring the level of free acetaldehyde on a sample, whether a preform, pellet, powder, or other form is the ASTM # F2013-00 test method. Samples are cryogenically ground through a Wiley Mill equipped with a 1.0 mesh screen. The final ground material has a particle size less than 800 µm. A portion of a sample (0.20 g) is weighed into a 20-mL head-space vial, sealed and then heated at 150° C. for sixty minutes. After heating, the gas above the sealed sample of PET polymer is injected onto a capillary GC column. The free acetaldehyde is separated, and the ppm of free acetaldehyde present in the sample is then calculated. The amount of acetaldehyde calculated represents the amount of free or residual acetaldehyde present in the sample.

For measuring the acetaldehyde generation rate on preforms, it is sufficient to use this ASTM # F2013-00 Method as described above without subjecting the preforms to a further melt history since by virtue of making a preform, the pellets are melted in an extruder prior to injection molding. By melt extruding or injection molding, AA precursors in the polymer melt have the opportunity to covert to acetaldehyde.

The acetaldehyde generation rate can be measured on the solid particles. However, for purposes of measuring the free acetaldehyde generation, the sample has to undergo a second melt history in order to determine the level of free acetaldehyde generated. If the sample is a particle or powder which has not undergone a melt step in addition to a prior melt phase polycondensation step, the sample is first treated according to the Sample Preparation procedure described below, after which the sample is submitted to the ASTM # F2013-00 test method for analysis.

Sample Preparation: For the purpose of measuring the acetaldehyde generation rate, and if the sample had not seen a melt history subsequent to melt phase polycondensation, it is prepared according to this method prior to submitting the sample to the ASTM # F2013-00 test. Samples of polymer powder (ground to pass a 3 mm screen) were heated in an oven at 115° C. under vacuum (25-30 in. Hg) with a 4 SCFH nitrogen purge for at least 48 h. Although overnight drying would be sufficient for water removal alone, this extended oven treatment also served to desorb to about 1 ppm or less the residual AA present in the high IV powder after melt-phase-only synthesis and prior to AA generation testing. If pellets had not been stripped beforehand of most of the residual AA (target: 1 ppm or less), it was necessary to desorb residual AA from the pellets. Pellets were ground to pass a 2 mm screen prior to residual AA removal under the conditions described above. If grinding was not done, it would take longer and/or require a higher temperature to desorb residual AA from pellets to about 1 ppm or less, due to the larger particle size (longer diffusion path). Any suitable acetaldehyde devolatization technique can be employed on pellets to reduce the level of free acetaldehyde down to about 1 ppm or less, including passing hot inert gas over the pellets for a time period sufficient to reduce the residual acetaldehyde to the desired level. Preferably, the acetaldehyde devolatization temperature should not exceed 165° C., or more preferably, not exceed 160° C., or even more preferably, not exceed 150° C. The sample was then packed in a preheated Tinius Olsen melt indexer, a.k.a. an extrusion plastometer, using a steel rod. The orifice die was calibrated according to ASTM D 1238. A small amount of material was purged out the bottom, which was then plugged. The piston rod assembly was put in the top of the barrel. A 225 g weight was placed on top of the piston rod to hold the rod down inside of the barrel. The polymer was held at 295° C. for 5 min. The orifice plug was then removed from the bottom of the barrel. Via a large weight and operator pressure, the extrudate was pushed out of the barrel into an ice water bath. The extrudate was patted dry, sealed in a bag and placed in a freezer until the ASTM # F2013-00 test is performed.

Alternatively, a CEAST Model 7027 Modular Melt Flow instrument is used. An AA generation program is initiated that will maintain a temperature of 295° C. and will extrude the melted PET material in 5 minutes at a constant flow rate as defined in the firmware of the instrument. As the extrudate is pushed out of the barrel and into an ice water bath, the sample is collected, patted dry, sealed in a bag and placed in a freezer until the ASTM # F2013-00 test is performed.

Acetaldehyde can be generated in polyester resins with the Ceast Model 7027 Modular Melt Flow or any similar extrusion plastometer instrument; however, the Ceast 7027 instrument is preferred because the automated functions of this instrument reduce test variability by maintaining consistent contact times for the polymer inside the extrusion barrel. This particular model of instrument incorporates automated packing of the resin at the start of the test procedure. The instrument is equipped with a motorized platform that will push the material out of the barrel until the piston is at a specified height above the bottom of the barrel. The platform will then hold the piston rod in place, allowing the resin to heat up and generate acetaldehyde. At the end of the specified hold time, the platform extrudes the remainder of the resin out of the barrel while traveling at a constant speed. These steps eliminate the possibility of variability in results from packing the material through the final extrusion step. Variability in loading the polymer is reduced with the design of the barrel, but loading of the polymer is not automated.

Acetaldehyde can be generated in the above manner over a temperature range of 265° C. to 305° C. The most consistent results are obtained between 275° C. and 295° C. The length of time the resin is held inside the barrel shows good results when between 2 and 15 minutes. The range of 5 to 10 minutes shows the best repeatability and distinction between materials. For the AA generation numbers stated for this invention, 295° C. and 5 minutes were used.

Use of this method of acetaldehyde generation and testing allows for screening of polyester resins for acetaldehyde generation without needing large amounts of material for evaluations such as molding of bottle preforms. As little as 10 grams of material may be used in this process making it ideal for testing laboratory samples.

In the invention, it is now possible to provide a feed of polyester polymer particles made without solid state polymerization to a subsequent melt processing step (e.g., extrusion/injection molding) having both low residual acetaldehyde and a low acetaldehyde generation rate. Advantageously, the melt phase production of the polyester particles no longer has to be controlled nor restricted to the low production temperatures to produce polyester polymer particles having a low level of residual acetaldehyde (e.g., less than about 13 ppm). Instead, a polyester polymer particle having a low level of residual acetaldehyde and a low acetaldehyde generation can now be obtained from a melt phase production of the polyester polymer with an acceptable throughput or production rate. By this method, a robust melt-phase production process with a wide manufacturing window is feasible in which the addition of an acetaldehyde scavenger is not necessary or desirable, which allows for the use of a conventional Ti catalyst composition, and permits the advancement of the polyester polymer to a high It.V. By deactivating the Ti catalyst such that conversion of acetaldehyde precursors does not occur in the subsequent transfer piping after the vacuum has been released in the melt-phase-only manufacturing process and during subsequent melt processing, particles having low AA fit for making preforms can be provided to an injection molding machine.

The particles of the invention are directly or indirectly packaged as a bulk into shipping containers, which are then shipped to customers or distributors. It is preferred to subject the crystallized particles to any process described herein without solid state polymerizing the particles at any point prior to packaging the particles into shipping containers. With the exception of solid state polymerization, the particles may be subjected to numerous additional processing steps in-between any of the expressed steps.

Shipping containers are containers used for shipping over land, sea or air. Examples include railcars, semi-tractor trailer containers, Gaylord boxes, ship hulls, or any other container which is used to transport finished polyester particles to a customer. Customers are typically converter entities who convert the particles into preforms or other molded articles.

The shipping containers contain a bulk of polyester polymer particles. A bulk occupies a volume of at least about 3 cubic meters. In preferred aspects, the bulk in the shipping container occupies a volume of at least 5 cubic meters, or at least 10 cubic meters.

In one aspect, there is provided finished polyester polymer particles comprising:
an It.V. of at least about 72 dL/g or greater, or 0.74 dL/g or greater, or 0.76 or greater dL/g, or 0.80 dL/g or greater, obtained in a melt phase polymerization production,
a degree of crystallinity of at least about 20%, or at least 30%
a residual acetaldehyde level of about 10 ppm or less, or 5 ppm or less, or 3 ppm or less
titanium atoms,
phosphorus atoms,
an acetaldehyde generation rate less than about 20 ppm, or less than 18 ppm, or less than 16 ppm, or less than 14 ppm, or less than 12 ppm, or a reduction in acetaldehyde generation rate or perform AA of at least about 10%, or at least 20%, or at least 30%, or at least 40%, or at least 50%, or at least 60% or more, relative to the composition without the addition of a catalyst deactivator,
lacking organic acetaldehyde scavengers, and
which have not been solid state polymerized.

These particles preferably have a b* of about 5 or less, or 3 or less and an L* at least about 55, or at least 60, or at least 65, of 70 or more, or 73 or more, or 76 or more, or 79 or more. These particles preferably do not contain AA scavengers.

By "finished" particles is meant particles that have been subjected by the particle manufacturer to all the processing conditions needed to produce a particle ready for feeding into dryer hoppers associated with a molding machine or directly to a molding machine used for converting particles into articles, without any further processing steps performed by the particle manufacturer.

The articles can be formed by melt processing the polyester particles by any conventional techniques known to those of skill. For example, polyester particles crystallized to a degree of crystallization of at least about 20%, are fed to a machine for melt extruding and injection molding the melt into shapes such as preforms suitable for stretch blow molding into beverage or food containers, or rather than injection molding, merely extruding into other forms such as sheet. Suitable processes for forming the articles are known and include extrusion, extrusion blow molding, melt casting, injection molding, a melt to mold process, stretch blow molding (SBM), thermoforming, and the like.

Examples of the kinds of shaped articles which can be formed from the melt phase products and the polyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat-set beverage bottles suitable for holding beverages which are hot filled into the bottles are examples of the types of bottles which are made from the crystallized pellet of the invention. Examples of trays are those which are dual ovenable and other CPET trays.

In another aspect of the invention, there is provided a process for making articles comprising:
(i) introducing solid polyester polymer particles, having:
an It.V. of at least about 0.72 dL/g, or at least 0.74 dL/g, or at least 0.76 dL/g, or at least 0.80 dL/g obtained in melt phase polymerization,
a degree of crystallinity of at least 20%,
a residual acetaldehyde level of 10 ppm or less,
residues of a polycondensation catalyst composition comprising titanium species,
residues of a catalyst deactivator, preferably containing phosphorus atoms;
and lacking added organic acetaldehyde scavengers,
into a melt processing zone and melting the particles to form a molten polyester polymer composition; and
(ii) forming an article comprising a sheet, film, strand, tube, fiber, or a molded part from the molten polymer composition,
said molten polymer composition formed into the article having an acetaldehyde generation rate of less than about 20 ppm, or 18 ppm or less, or 16 ppm or less, or 14 ppm or less, or 12 ppm or less, or 10 ppm or less, (as measured by melting a portion of the polyester particles in an extrusion plastometer at 295° C. for 5 min.), or having a reduction in acetaldehyde generation rate or in perform AA of at least about 20%, or at least 30%, or at least 40%, or at least 50%, or at least 60%, relative to the same composition without the addition of a catalyst deactivator.

In this aspect, Ti catalyzed polyester polymer particles produced in the melt phase are made to a high It.V. and are provided as a suitable feed to the melt processing zone by having both low residual acetaldehyde and a low acetaldehyde generation rate without the presence of acetaldehyde scavengers in the particles fed to the melt processing zone. In this case, the acetaldehyde generation is measured on the particle feed, using the Sample Preparation technique described above to impart a melt history to the particles. In this aspect, the residual acetaldehyde can be lowered to less than 10 ppm acetaldehyde by gas stripping the particles produced from the melt phase production process. Further, the catalyst deactivator added in the melt phase at least partially inhibits the Ti catalyst residues in the polymer from converting acetaldehyde precursors to acetaldehyde. In this aspect, the particles fed to the melt processing zone are preferably not solid-state polymerized. The polyester particles made by melt-phase-only synthesis have a small surface to center molecular weight gradient and undergo less It.V. loss during melt processing than conventional polyesters. For example, bottles and/or preforms, and in particular beverage bottles such as carbonated soft drink or water bottles are made from the particles of the invention and the It.V. difference between the It.V. of the particles and the It.V of the preforms and/or bottles is not more than about 0.04 dL/g, or not more than 0.03 dL/g, or not more than 0.02 dL/g.

In another aspect, the molded article preferably lacks an organic acetaldehyde scavenger. In another aspect, ingredients added to the solid polyester particles at the melt processing step do not include organic acetaldehyde scavengers.

In another aspect, there is provided a process for making articles comprising:
(i) introducing solid polyester polymer particles, having:
an It.V. of at least 0.72 dL/g obtained in melt phase polymerization,
a degree of crystallinity of at least 20%,
a residual acetaldehyde level of 10 ppm or less,
residues of a polycondensation catalyst composition comprising titanium species, and
lacking acetaldehyde scavengers,
into a melt processing zone and melting the particles to form a molten polyester polymer composition; and
(ii) forming an article comprising a sheet, strand, fiber, or a molded part from the molten polymer composition, wherein the article, such as a perform or 20 oz. bottle, has less than or equal to about 10 ppm of acetaldehyde, or 8 ppm or less, or 6 ppm or less, or 4 ppm or less, acetaldehyde.

The amount of free AA on the molded article can be measured by ASTM F2013-00. The molded article is made using a barrel temperature setting of 285° C. and the melt residence time of approximately 2 minutes. Performs can be made from the particles of this invention at a variety of injection molding barrel temperatures and residence times. Specific injection molding conditions are given here only to provide context for the numerical values specified for preform AA and not to limit the invention to certain injection molding conditions. Alternatively, preforms made from the particles of this invention have a reduction in free AA for the perform of at least about 20% or at least 30% or more, or at least 40% or more, or at least 50% or more, or at least 60% or more relative to preforms made from the composition without the addition of a catalyst deactivator.

In this aspect, the level of residual acetaldehyde is measured on the article, such as on a preform. In this case, a second melt history (melt manufacturing is counted as the first) need not be imparted to the preform sample since the particles were melted in the injection molding machine. The amount of residual acetaldehyde present in the particles after drying but prior to injection molding should be subtracted from the residual acetaldehyde value obtained in the perform.

At the melt processing extruder, other components can be added to the extruder to enhance the performance properties of the pellets. These components may be added neat to the bulk polyester pellets or in a liquid carrier or can be added to the bulk polyester pellets as a solid polyester concentrate containing at least about 0.5 wt. % of the component in the polyester polymer let down into the bulk polyester. The types of suitable components include crystallization aids, impact modifiers, surface lubricants, denesting agents, compounds, antioxidants, ultraviolet light absorbing agents, colorants, nucleating agents, reheat rate enhancing aids, sticky bottle additives such as talc, and fillers and the like can be included. All of these additives and many others and their use are well known in the art and do not require extensive discussion.

As described above, the catalyst deactivators are added late in the course of polycondensation or thereafter but before solidification. In another aspect, while the bulk of a catalyst deactivator is added late in the course of polycondensation or thereafter but before solidification, a portion may be added earlier in the course of polycondensation. The impact on production rate of any early addition of a catalyst deactivator needs to be considered; therefore, only small portions, if any, should be added early. In addition, when the polyester melt contains catalyst deactivator added considerably earlier in the process, the late addition of more catalyst deactivator may not be as effective at lowering AA generation rate as the same total amount added late. This may be more of an issue as the percentage of the total catalyst deactivator added prior to late addition, as defined earlier, increases.

In addition to the aspect where the total amount of catalyst deactivator is added during the melt phase process for making the polyester polymer, in another aspect, total amount of catalyst deactivator is added to the polyester polymer in at least two portions, at least one in the melt phase process for making the polyester polymer and at least one other at any point after the polyester polymer is solidified and before the article is formed from the polyester polymer, such as during melt processing the polyester polymer to make an article as conventionally done in an extruder or injection molding machine for making the article. In yet a further aspect, the total amount of the catalyst deactivator is added after solidification and before making the article, for example, during melt processing of the polyester polymer into a bottle preform by injection molding.

Partial or total addition of the catalyst deactivator after solidification from a melt phase manufacturing process may be accomplished by either melt compounding the catalyst deactivator with the polyester polymer particles to form a solid concentrate of polyester polymer particles containing randomly dispersed catalyst deactivator compounds, after which the concentrate is fed to the melt processing zone for making an article along with a feed stream of polyester particles; or a stream of catalyst deactivator can be added directly as a neat stream, or in a slurry or dispersion made with a liquid carrier, together with a stream of the polyester polymer particles to the melt processing zone to make the articles. Thus, in one aspect an amorphous solid polyester polymer particles are produced from a melt phase process without a catalyst deactivator added late, and crystallized, followed by blending the catalyst deactivator with the polyester polymer by a compounding extrusion or in the extruder portion of the injection molding process such as that used to melt blend solid, liquid, or molten ingredients into a stream of polyester polymer in an extruder, or that used to make a molded article by an extrusion in the injection molding process, or blending in any other mixing device. In this aspect, the solid polyester polymer particles produced from a melt phase process without a catalyst deactivator added late are optionally produced with enough crystallinity to undergo an extrusion without wrapping the screw, that is, the polyester polymer particles are not amorphous, and hence, there is no need for a separate crystallization step.

In this aspect, the mixing device where the catalyst deactivator is introduced may be part of the injection molding process, or it may be a separate step prior to injection molding. The catalyst deactivator may be introduced neat, in a liquid carrier or via a polymer concentrate. Introduction neat or in a liquid carrier is preferred since reaction with the catalyst in the polymer carrier may lower effectiveness. If the catalyst deactivator is a liquid and is added neat, a mixer at ambient conditions could be used to coat the pellets with the liquid additive prior to entry into an extruder. If the polymer concentrate route is used, the concentrate pellets could be dry blended at ambient conditions with the made-exclusively-in-the-melt-phase pellets to make a 'salt and pepper' type blend. These same comments and approaches apply to melt blending the catalyst deactivator with solid-stated pellets.

This aspect is particularly useful if the pellets are solid state polymerized. Incorporating the catalyst deactivator in the melt phase may in some instances lower the solid-stating rate. If one desires to solid state polymerize the polyester pellets, it is advantageous to add the catalyst deactivator after the pellets have undergone a solid state polymerization process.

In one aspect, the bottle preforms made from the polyester polymer obtained by the process of the invention will have an L* of at least about 50, or at least 60, or at least 65, or at least 70. In another aspect, the bottle preforms made from the polyester polymer obtained by the process of the invention will have a b* value of no greater than about 5.0, or no greater than 3.0, while maintaining an L* brightness of at least 50, or at least 60, or at least 65, or at least about 70.

The quantity of phosphorus as a catalyst deactivator added late relative to the titanium atoms used in this process is not limited, but consideration is taken for the amount of titanium metal and other metals present in the melt. The ratio of phosphorus moles to titanium moles is desirably at least about 0.15:1, or at least 0.3:1, or at least 0.5:1, or at least 0.7:1, or at least 1:1, or at least 2:1.

This invention can be further illustrated by the additional examples of aspects thereof, although it will be understood that these examples are included merely for purposes of illustration and are not intended to limit the scope of the invention.

Experimental

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. For samples in the Examples section, the viscosity of the polymer solutions is determined using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where
  $\eta_{inh}$=Inherent viscosity at 25° C. at a polymer concentration of 0.5 g/100 mL of 60% phenol and 40% 1,1,2,2-tetrachloroethane by weight
  ln=Natural logarithm
  $t_s$=Sample flow time through a capillary tube
  $t_o$=Solvent-blank flow time through a capillary tube
  C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}(\ln \eta_r)/C$$

where
  $\eta_{int}$=Intrinsic viscosity
  $\eta_r$=Relative viscosity=$t_s/t_o$
  $\eta_{sp}$=Specific viscosity=$\eta_r - 1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

$$\text{Calibration Factor} = \frac{\text{Accepted } Ih.V. \text{ of Reference Material}}{\text{Average of Triplicate Determinations}}$$

The intrinsic viscosity (It.V. or $\eta_{int}$) may be estimated using the Billmeyer equation as follows:

$$\eta_{int} = 0.5[e^{0.5 \times \text{Corrected } Ih.V.} - 1] + (0.75 \times \text{Corrected Ih.V.})$$

The reference for estimating intrinsic viscosity (Billmeyer relationship) is J. *Polymer Sci.*, 4, pp. 83-86 (1949).

Alternatively, the viscosity of the polymer solutions is determined using a Viscotek Modified Differential Viscometer. A description of the operating principle of the differential pressure viscometers can be found in ASTM D 5225. The uncorrected inherent viscosity ($\eta_{inh}$) of each sample is calculated from the Viscotek Model Y501 Relative Viscometer using the following equation:

$$\eta_{inh} = [\ln(P_2/KP_1)]/C$$

where
  $P_2$=The pressure in capillary $P_2$
  $P_1$=The pressure in capillary $P_1$
  ln=Natural logarithm
  K=Viscosity constant obtained from baseline reading
  C=Concentration of polymer in grams per 100 mL of solvent The corrected Ih.V., based on calibration with standard reference materials, is calculated as follows:

Corrected Ih.V.=Calculated Ih.V.×Calibration Factor

The L* or b* color can be measured on specimens ground to a powder or molded into a disc or molded into a preform or blown into a bottle, as explained below. A specimen is considered to be within a specified L* or b* color range in the appended claims if the reported L* or b* value obtained from a specimen measured by any one of these test methods is within the ranges expressed in the appended claims. For example, a b* color value outside a specified b* range as measured by one test method but inside a specified b* range as measured by another test method is deemed to be a polymer within the specified range because it satisfied the specified b* color range by one of the test methods.

The measurements of L* and b* color values are conducted on specimens prepared according to any one of the following methods. Alternatively, color values are measured on polyester polymers ground to a powder passing a 3 mm screen.

For powdered samples, color measurements were performed in reflectance (specular included) using a HunterLab UltraScan XE (Hunter Associates Laboratory, Inc., Reston Va.), which employs diffuse/8° (illumination/view angle) sphere optical geometry. Results were reported using the CIELAB scale with the D65 illuminant and 10° observer. The spectrophotometer was standardized regularly and UV control was employed and maintained in calibration following the HunterLab recommendations. An optional glass port plate was installed at the reflectance port to minimize contamination of the sphere. Powders were placed in a cell that is metallic gray, except for the glass front. The optical-grade glass was recessed from the front of the cell by 0.062" and the glass itself is 0.092" thick. The sample area was 0.71" deep, 1.92" wide, 2.35" tall. The powders were allowed to settle by vibrating the sample for 20 seconds using a laboratory Mini-Vortexer (VWR International, West Chester, Pa.). The glass cell was maintained flush against the reflectance port and covered with a black opaque cover. A single cell packing was evaluated and the cell was removed and replaced for three replicate measurements for each sample. The reported value should be the average of the triplicates.

The polyester polymer specimens, which are ground to a powder, have a preferably a minimum degree of crystallinity of, for example, about 15%. Accordingly, it is expected that care should be taken when analyzing bottles from this method because bottles have regions of lower crystallinity. In the event that it is not possible to separate crystalline polymer from amorphous polymer, it is expected that the disc method will be better suited to evaluate the color values.

Color is measured from polymer molded into discs (3 cm diameter with a thickness of in a range of 66 to 68 mils), using a Daca MicroCompounder/MicroInjector. In the case of discs, a HunterLabUltraScan spectrophotometer is used to measure L*, a* and b* on three discs stacked together (in a range of approximately 198 to 204 mil thickness). A series of three, 3-cm diameter, about 65-68 mil thick clear discs are prepared from the polyester sample to be analyzed. Disc preparation is done by extruding each the polyester sample at a temperature of 278° C. with 1.4 scfh nitrogen flow to the feed throat, and 120 rpm screw speed into a micro-injector barrel at 283-285° C. The barrel should be purged with material before attempting to mold any discs. The final discs are prepared using an injector pressure of 100 psig to the injection piston. The disc mold is maintained at a temperature range of 10-20° C. by circulation of chilled water. Alternative extrusion equipment may be used provided that the samples are melted at these temperatures and extruded at the stated rate. The HunterLabUltraScan spectrophotometer is operated using a D65 illuminant light source with a 100 observation angle and integrating sphere geometry. The color measurement is made in the total transmission (TTRAN) mode, in which both light transmitted directly through the sample and the light that is diffusely scattered is measured. Three discs are stacked together using a holder in front of the light source, with the area having the largest surface area placed perpendicular to the light source.

Polymer crystallinity was determined using Differential Scanning Calorimetry (DSC). The sample weight for this measurement is 10±1 mg. The specimens subjected to analysis were preferably cryogenically ground. The first heating scan was performed. The sample was heated from approximately 25° C. to 290° C. at a rate of 20° C./minute, and the absolute value of the area of the melting endotherms (one or more) minus the area of any crystallization exotherms is determined. This area corresponds to the net heat of melting and is expressed in Joules. The heat of melting of 100% crystalline PET was taken to be 119 Joules/gram, so the weight percent crystallinity of the pellet is calculated as the net heat of melting divided by 119, and then multiplied by 100. Unless otherwise stated, the initial melting point in each case was also determined using the same DSC scan.

The percent crystallinity was calculated from both of:
Low peak melting point: $T_{m1a}$
High peak melting point: $T_{m1b}$ Note that in some cases, particularly at low crystallinity, rearrangement of crystals may occur so rapidly in the DSC instrument that the true, lower melting point is not detected. The lower melting point may then be seen by increasing the temperature ramp rate of the DSC instrument and using smaller samples. A Perkin-Elmer Pyris-1 calorimeter was used for high-speed calorimetry. The specimen mass is adjusted to be inversely proportional to the scan rate. About a 1 mg sample is used at 500° C./min and about 5 mg are used at 100° C./min. Typical DSC sample pans were used. Baseline subtraction was performed to minimize the curvature in the baseline.

Alternatively, percent crystallinity may be calculated from the average gradient tube density of two to three pellets. Gradient tube density testing is performed according to ASTM D 1505, using lithium bromide in water.

The reheat rate of each of the molded discs was determined as follows. The disc was placed onto a support which was in contact with the sample along its edges only. An actuator then automatically moved the disc beneath a pyrometer and measured the initial temperature ($T_i$). The disc was then moved to a fixed distance below a lamp housing equipped with a bulb (GE DYH projection bulb, 250 W, 120 V) operating at 60 V. The sample was exposed to a radiant light for 20 seconds. The color temperature of the lamp was approximately 2,200° C. After heating, the disc was automatically returned to the pyrometer where the surface temperature ($T_f$) of the center area of the side which faced the lamp (front side) was recorded two seconds after the lamp was turned off. A 90-second cooling cycle was used between consecutive tests, during which a fan cooled the lamp housing prior to loading the next sample. The RIT is calculated by subtracting the $T_f$ of the control without reheat additive from the $T_f$ of the sample containing the reheat additive.

Reheat Improvement Temperature (RIT) of polyester polymer preforms is measured using twenty-ounce bottle preforms. In order to determine the RIT of each composition, all preforms are run through the oven bank of a Sidel SBO2/3 blow molding unit in a consistent manner. A series of twenty-ounces preforms (with an outer diameter of 0.846 inches and a sidewall cross-sectional thickness of 0.154 inches) are run through the oven bank of a Sidel SBO2/3 blow molding unit. The lamp settings for the Sidel blow molding unit are shown in Table 1. The preform heating time in the heaters is 38 seconds, and the power output to the quartz infrared heaters is set at 64%. %. A series of five preforms is passed in front of the quartz infrared heaters and the preform surface temperature was measured.

TABLE 1

Sidel SBO2/3 lamp settings.

| Heating zone | Lamp power setting (%) | Lamps ON = 1 OFF = 0 | | |
|---|---|---|---|---|
| | | Heater 1 | Heater 2 | Heater 3 |
| Zone 8 | | | | |
| zone 7 | | | | |
| Zone 6 | | | | |
| Zone 5 | 90 | 1 | 0 | 1 |
| Zone 4 | 90 | 1 | 0 | 1 |
| Zone 3 | 90 | 1 | 0 | 1 |
| Zone 2 | 90 | 1 | 0 | 1 |
| Zone 1 | 90 | 1 | 1 | 1 |

The preform reheat improvement temperature (RIT) is then calculated by comparing the difference in preform surface temperature of the target samples containing a reheat additive with that of the same polymer having no reheat additive. The higher the RIT value, the higher the reheat rate of the composition.

The polycondensation reactions in Comparative Examples A, C, D, and Examples A, B, C, D E & F employed a PET oligomer prepared predominantly from terephthalic acid and ethylene glycol, and containing about 1.5 mole percent of about 35% cis/65% trans 1,4-cyclohexanedimethanol and about 1.5 weight percent of diethylene glycol. This oligomer has about 90% to 95% conversion of acid groups, due to some variance among batches and/or test methods, via proton NMR/titration of acid groups.

Comparative Example A

For polycondensation, ground oligomer (103 g) was weighed into a half-liter, single-necked, round-bottomed flask. The catalyst employed was antimony triacetate, and it was added a solution in ethylene glycol to the flask. Red and blue toners were added to the flask in the amounts shown in Table 4 for Comparative Example A. A 316 L stainless steel paddle stirrer and glass polymer head were attached to the flask. After attaching the polymer head to a side arm and a purge hose, two nitrogen purges were completed. The polymerization reactor is operated under control of a CAMILE™ automation system, programmed to implement the following array (Table 1).

TABLE 1

| Stage | Time Minutes | Temperature C.° | Vacuum torr | Stir Speed rpm |
|---|---|---|---|---|
| 1 | 0.1 | 285 | 730 | 0 |
| 2 | 10 | 285 | 730 | 150* |
| 3 | 2 | 285 | 140* | 300* |
| 4 | 1 | 285 | 140 | 300 |
| 5 | 10 | 285 | 51* | 300 |
| 6 | 5 | 285 | 51 | 300 |
| 7 | 1 | 285 | 4.5* | 300 |
| 8 | 20 | 285 | 4.5 | 300 |
| 9 | 2 | 285 | 0.8* | 30* |
| 10 | 58 | 285 | 0.8 | 30 |
| 11 | 3 | 285 | 650* | 30 |
| 12 | 2 | 285 | 650 | 30 |
| 13 | 1 | 285 | 0.5* | 45* |
| 14 | 5 | 285 | 0.5 | 45 |

*= ramp

A molten bath of Belmont metal was raised to surround the flask, and the CAMILE™ array was implemented. In this array, a "ramp" is defined as a linear change of vacuum, temperature, or stir speed during the specified stage time. The stirring system was automatically calibrated between stages 4 and 5. Typical conditions for polymerizations catalyzed by antimony compounds were at about 285° C. and about 250 ppm Sb in the polymer. When terminating a polymer sample under these conditions at a torque equivalent to approximately 0.80 IhV, the finisher stage time was about 58 minutes, and hence, the amount of time used in stage 10. After the 58 minutes of finishing time, the vacuum was broken, a commercial oligomeric phosphate triester formulation was added to the Sb control during stage 12, and vacuum was resumed in stage 13 to enhance mixing in stage 14. In order to lower the amount of solvent present which could hydrolyze or glycolyze the polymer, no ethylene glycol, n-butanol, water, or anything else was added to the commercial oligomeric phosphate triester formulation prior to its introduction during stage 12. A commercial oligomeric phosphate tri-ester formulation was added directly as a 9 wt./wt. % phosphorus. The smallest amount of the oligomeric phosphate triesters that could be reproducibly added by volume via syringe to the polymer was 0.02 mL, which corresponds to a target of about 20 ppm P in the polymer.

Following the end of the array or lab preparation, the polymer was cooled for about 15 min., separated from the glass flask, cooled for about 10 min. and then placed immediately into liquid nitrogen. The polymer was ground cryogenically to pass a 3 mm screen. The residual or free AA sample is kept frozen until its measurement by headspace GC per ASTM # F2013-00.

The ground polymer was analyzed for acetaldehyde generation rate via processing at 295° C. for 5 minutes in a Tinius Olsen melt indexer, a.k.a. an extrusion plastometer (AAGen 295/5), free AA (AAFN), metals via X-ray fluorescence, inherent viscosity, L*, a*, and b* color. Three chips were made, stacked and tested for chip color. The data can be seen in Table 4.

Example A

For polycondensation, ground oligomer (103 g) was weighed into a half-liter, single-necked, round-bottomed flask. The catalyst employed was titanium tetrabutoxide and it was added to the flask as a solution in n-butanol. Red and blue toners were added to the flask in the amounts shown in Table 4 for Example A. The amounts of red and blue toners were chosen in an attempt to obtain a similar chip a* and chip b* to those obtained for Comparative Example A as shown in Table 4. A 316 L stainless steel paddle stirrer and glass polymer head were attached to the flask. After attaching the polymer head to a side arm and a purge hose, two nitrogen purges were completed. The polymerization reactor was operated under control of a CAMILE™ automation system, programmed to implement the following array (Table 2).

TABLE 2

| Stage | Time minutes | Temperature C.° | Vacuum torr | Stir Speed rpm |
|---|---|---|---|---|
| 1 | 0.1 | 270 | 730 | 0 |
| 2 | 10 | 270 | 730 | 150* |
| 3 | 2 | 270 | 140* | 300* |
| 4 | 1 | 270 | 140 | 300 |
| 5 | 10 | 270 | 51* | 300 |
| 6 | 5 | 270 | 51 | 300 |
| 7 | 1 | 270 | 4.5* | 300 |
| 8 | 20 | 270 | 4.5 | 300 |
| 9 | 2 | 270 | 0.8* | 30* |

TABLE 2-continued

| Stage | Time minutes | Temperature C.° | Vacuum torr | Stir Speed rpm |
|---|---|---|---|---|
| 10 | 66 | 270 | 0.8 | 30 |
| 11 | 3 | 270 | 650* | 30 |
| 12 | 2 | 270 | 650 | 30 |
| 13 | 1 | 270 | 0.5* | 45* |
| 14 | 5 | 270 | 0.5 | 45 |

*= ramp

A molten bath of Belmont metal was raised to surround the flask, and the CAMILE™ array was implemented. In this array, a "ramp" is defined as a linear change of vacuum, temperature, or stir speed during the specified stage time. The stirring system was automatically calibrated between stages 4 and 5. To compare the two catalyst systems when the finisher residence times were similar, the titanium level in this example was 10 ppm and the temperature was relatively low at 270° C. When terminating a polymer sample under these conditions at a torque equivalent to approximately 0.80 IhV, the finisher stage time for Ti-catalyzed runs was around 66 minutes, and hence, the amount of time used in stage 10. After the 66 minutes of finishing time, the vacuum was broken, a commercial oligomeric phosphate triester formulation was added during stage 12, and vacuum was resumed in stage 13 to enhance mixing in stage 14. During stage 12, the commercial oligomeric phosphate tri-ester formulation was added directly, that is, with nothing else added to the formulation, as a 9 wt./wt. % phosphorus. The smallest amount of the oligomeric phosphate triesters that could be reproducibly added by volume via available syringes to the polymer was 0.02 mL, which corresponds to a target of about 20 ppm P in the polymer. A lower amount P for the same Ti level, that is, a lower P:Ti mole ratio, may be as effective to a certain point. For example, in Example A, the P:Ti mole ratio using the XRF values was 1.85. A comparable result is expected at P:Ti of 1; however, it was difficult to add the very small amount of oligomeric phosphate triesters needed to do achieve P:Ti mole ratio of 1 on the lab scale.

Following the end of the array or lab preparation, the polymer was cooled for about 15 min., separated from the glass flask, cooled for about 10 min. and then placed immediately into liquid nitrogen. The polymer was ground cryogenically to pass a 3 mm screen. The residual or free AA sample was kept frozen until its measurement by headspace GC per ASTM # F2013-00.

The ground polymer was analyzed for acetaldehyde generation rate via processing at 295° C. for 5 minutes in a Tinius Olsen melt indexer, a.k.a. an extrusion plastometer (AAGen 295/5), free AA (AAFN), metals via X-ray fluorescence, inherent viscosity, L*, a*, and b* color. Three chips were made, stacked and tested for chip color. The data can be seen in Table 4. Comparative Example A and Example A illustrate that making a polyester polymer at 270° C. with 10 ppm Ti can require a similar finisher time or production rate as making a polyester polymer at 285° C. with about 250 ppm Sb, even though the Ti case had much lower catalyst loading and a temperature 15° C. cooler. In addition, Comparative Example A and Example A illustrate the lower residual AA in the solid polyester particles, and the lower AA generation rate upon melting as exemplified by a titanium catalyst relative to an antimony catalyst, when a catalyst deactivator, in this case, oligomeric phosphate triesters, is added late. The results also demonstrate that Ti-catalyzed polyester polymer with late addition of catalyst deactivator can be toned to a similar chip b* color to an antimony-catalyzed polymer when both are made with similar finisher stage times. The Chip L* brightness of the Ti-catalyzed polymer (Example A) was only a few units darker than the Chip L* brightness of the Sb-catalyzed polymer (Comparative Example A). This L* difference may increase somewhat if the amount of red toner added to the Sb case were decreased so as to give a neutral or zero chip a*, similar to the Ti case; however, the L* difference may decrease somewhat if the amount of blue toner added to the Ti case were decreased so as to give a more similar chip b* to the Sb case.

Comparative B:

The starting oligomeric mixture employed, was prepared from predominantly terephthalic acid and ethylene glycol. The oligomer also contained about 1.5 mole percent of about 35% cis/65% trans 1,4-cyclohexanedimethanol, and about 1.2-1.3 weight percent of diethylene glycol. The conversion of acid groups was about 95% by proton NMR/titration carboxyl ends groups. The $M_n$ of the oligomeric mixture was about 766 g/mole, and the $M_w$ was about 1478 g/mole.

For polycondensation, ground oligomer (103 g) was weighed into a half-liter, single-necked, round-bottomed flask. The catalyst employed was titanium tetrabutoxide and it was added to the flask as a solution in n-butanol. No toners were added to the flask. A 316 L stainless steel paddle stirrer and glass polymer head were attached to the flask. After attaching the polymer head to a side arm and a purge hose, two nitrogen purges were completed. The polymerization reactor was operated under control of a CAMILE™ automation system, programmed to implement the following array (Table 3).

TABLE 3

| Stage | Time Minutes | Temperature C.° | Vacuum Torr | Stir Speed rpm |
|---|---|---|---|---|
| 1 | 0.1 | 270 | 730 | 0 |
| 2 | 10 | 270 | 730 | 150* |
| 3 | 2 | 270 | 140 | 300* |
| 4 | 1 | 270 | 140 | 300 |
| 5 | 10 | 270 | 25* | 300 |
| 6 | 10 | 270 | 25 | 300 |
| 7 | 1 | 270 | 140* | 300 |
| 8 | 2 | 270 | 140 | 300 |
| 9 | 1 | 270 | 25* | 300 |
| 10 | 10 | 270 | 25 | 300 |
| 11 | 2 | 270 | 0.2* | 30* |
| 12 | 1 | 270 | 0.2 | 30 |
| 13 | 500# | 270 | 0.2 | 30 |

*= ramp;
= torque termination

A molten bath of Belmont metal was raised to surround the flask, and the CAMILE™ array was implemented. In this array, a "ramp" is defined as a linear change of vacuum, temperature, or stir speed during the specified stage time. The stirring system is automatically calibrated between stages 4 and 5. No phosphorus compounds were added to this run. The finisher stage (13) was terminated according to the stirrer torque. The target Ih.V. was 0.80 dL/g. An agitator torque target was identified for each finisher temperature and each polymerization rig. As the molecular weight and corresponding Ih.V. of the melt increases, its melt viscosity also increases which was correlated to the torque required by the agitator to turn a revolution. Each run was terminated when the torque target on the agitator was achieved three times.

Following the end of the array or lab preparation, the polymer was cooled for about 15 min., separated from the glass flask, cooled for about 10 min. and then placed immediately into liquid nitrogen. The polymer was ground cryogenically to pass a 3 mm screen. The residual or free AA sample was kept frozen until its measurement by headspace GC per ASTM # F2013-00.

The ground polymer was analyzed for acetaldehyde generation rate via processing at 295° C. for 5 minutes in a Tinius Olsen melt indexer, a.k.a. an extrusion plastometer (AAGen 295/5), free AA (AAFN), metals via X-ray fluorescence, and inherent viscosity. The data can be seen in Table 4.

No phosphorus compound was added late to Comparative Example B. The phosphorus level measured by XRF in Comparative Example B was 1.9 ppm. The limit of quantification for phosphorus by the XRF method used is about 2 ppm. Below 2 ppm, the amount of phosphorus listed may be noise. When no phosphorus compound had been added, low levels of phosphorus reported (around 2 ppm or less) may be noise. When no phosphorus compound had been added, and a level of 5 ppm is reported, there could be some trace phosphorus contamination after the fact, like during chip molding for the XRF test. This trace contamination is not expected to be as effective as a known phosphorus compound that is intentionally added.

For no phosphorus added compounds, the P:Ti mole ratio (MR) may be misleading, especially for low titanium levels like 5 ppm. For example, while Comparative Example B appears to have a P:Ti MR of about 0.3, there may actually be no phosphorus in the sample, since the level of phosphorus reported is close to the detection limit.

Example A illustrates the lower residual AA in the solid polyester particles, and the lower AA generation rate upon melting as exemplified by a polyester made with a titanium catalyst and late addition of a catalyst deactivator, relative to a polyester made with a titanium catalyst without late addition of a catalyst deactivator (Comparative Example B). The residual AA of Comparative Example B probably would have been higher if the same finisher vacuum used in Example A was used for Comparative Example B.

TABLE 5

| Stage | Time minutes | Temperature C.° | Vacuum torr | Stir Speed Rpm |
|---|---|---|---|---|
| 1 | 0.1 | 289 | 730 | 0 |
| 2 | 10 | 289 | 730 | 150* |
| 3 | 2 | 289 | 140* | 300* |
| 4 | 1 | 289 | 140 | 300 |
| 5 | 10 | 289 | 51* | 300 |
| 6 | 5 | 289 | 51 | 300 |
| 7 | 1 | 289 | 4.5* | 300 |
| 8 | 20 | 289 | 4.5 | 300 |
| 9 | 2 | 289 | 0.8* | 30* |
| 10 | 48 | 289 | 0.8 | 30 |
| 11 | 3 | 289 | 650* | 30 |
| 12 | 2 | 289 | 650 | 30 |
| 13 | 1 | 289 | 0.5* | 45* |
| 14 | 5 | 289 | 0.5 | 45 |

*= ramp

Red and blue toners were added to the PET oligomer prior to commencing the reaction at levels sufficient to target similar b* colors. Under these conditions, the finisher time for torque terminated Ti-catalyzed runs with a 0.8 Ih.V. target was about 48 minutes, and hence, the amount of time in stage 10. The smallest amount of the oligomeric phosphate triesters that could be reproducibly added by volume via syringe to the polymer is 0.02 mL, which corresponds to a target of about 20 ppm P in the polymer. A lower amount P for the same Ti level, that is, a lower P:Ti mole ratio, may be as effective to a certain point. For example, in Examples B & C, the P:Ti mole ratio using the XRF values was about 4. Comparable results are expected at P:Ti of 1; however, it was difficult to add the very small amount of oligomeric phosphate triesters needed to do achieve P:Ti mole ratio of 1 on the lab scale, especially as the Ti level is lowered to 5 ppm, as in these examples.

TABLE 4

| | Catalyst | Temp (deg C.) | Finisher Time (min) | XRF Sb (ppm) | XRF Ti (ppm) | XRF P (ppm) | IhV (dLg) | ItV (dLg) | AAFN [ppm] | AA Gen 295/5 [ppm] |
|---|---|---|---|---|---|---|---|---|---|---|
| Comparative A | Sb | 285 | 58 | 248 | 0 | 18 | 0.831 | 0.881 | 20.95 | 22.19 |
| Example A | Ti | 270 | 66 | — | 10 | 12 | 0.773 | 0.816 | 4.22 | 10.74 |
| Comparative B | Ti | 270 | 58 | | 10 | 1.9 | 0.749 | | 9.98 | 28.06 |

| | Catalyst | Temp (deg C.) | Finisher Time (min) | Red Toner (ppm) | Blue Toner (ppm) | XRF Sb (ppm) | XRF Ti (ppm) | XRF P (ppm) | Powder L* | Powder a* | Powder b* | Chip L* | Chip a* | Chip b* |
|---|---|---|---|---|---|---|---|---|---|---|---|---|---|---|
| Comparative A | Sb | 285 | 58 | 6.69 | 13.38 | 248 | 0 | 18 | 75.91 | 0.12 | -2.62 | 77.27 | 1.19 | 2.54 |
| Example A | Ti | 270 | 66 | 9.06 | 18.13 | — | 10 | 12 | 74.76 | -0.58 | -4.8 | 73.8 | 0.06 | 1.84 |
| Comparative B | Ti | 270 | 58 | | | | 10 | 1.9 | | | | | | |

| | XRF Ti (ppm) | XRF P (ppm) | P:Ti Mole Ratio |
|---|---|---|---|
| Example A | 10 | 12 | 1.85 |
| Comparative B | 10 | 1.9 | 0.29 |

Example B, C & D

To further compare the two catalyst systems when the finisher stage residence time was similar, the titanium level was kept at 5 ppm while the reaction temperature was increased to 289° C. The array in Table 5 was used.

In the following table, the Sb run is the same one shown earlier in Comparative Example A. Due to the difficulties encountered in attempting to target similar b*, test variability, or one run wherein a high amount of phosphorus was added, the results of each titanium run are reported. Table 6 sets forth the results analyzed for a*, b* and L* color.

TABLE 6

| | Catalyst | Temp. (deg C.) | Finisher Time (min) | XRF Sb (ppm) | XRF Ti (ppm) | XRF P (ppm) | P:Ti Mole Ratio | IhV (dLg) | ItV (dLg) | AAFN (ppm) | AA Gen 295/5 (ppm) |
|---|---|---|---|---|---|---|---|---|---|---|---|
| Example B | Ti | 289 | 48 | — | 5 | 13 | 4.02 | 0.846 | 0.898 | 9.33 | 10.41 |
| Example C | Ti | 289 | 48 | — | 5 | 13 | 4.02 | 0.847 | 0.899 | 9.71 | 11.18 |
| Example D | Ti | 289 | 48 | 1 | 5 | 25 | 7.73 | 0.818 | 0.866 | 7.21 | 12.18 |
| Comparative A | Sb | 285 | 58 | 248 | 0 | 18 | | 0.831 | 0.881 | 20.95 | 22.19 |

| | Catalyst | Red Toner ppm | Blue Toner ppm | 3 disc L* | 3 disc a* | 3 disc b* | RHI (Ref. 9921W) | Powder L* | Powder a* | Powder b* | % Crystalinity |
|---|---|---|---|---|---|---|---|---|---|---|---|
| Example B | Ti | 7.69 | 15.39 | 73.80 | −0.24 | 4.19 | 0.997 | 73.3 | −0.87 | −2.41 | 34.1 |
| Example C | Ti | 7.69 | 15.39 | 74.64 | −1.18 | 2.36 | 0.993 | 73.69 | −1.37 | −3 | 34.7 |
| Example D | Ti | 7.69 | 15.39 | 75.01 | −2.14 | 1.02 | 0.996 | 74.29 | −1.91 | −2.96 | 34.1 |
| Comparative A | Sb | 6.69 | 13.38 | 77.27 | 1.19 | 2.54 | 0.967 | 75.91 | 0.12 | −2.62 | 38.5 |

Per Table 6, low levels of Ti, elevated polycondensation temperatures and late addition of a catalyst deactivator can produce solid PET particles with lower residual AA and low AA generation rates upon melting, relative to an Sb control. Example D indicates that more deactivator was not always better, in that, although the residual AA may be lower, the It.V. was lower and the AA generation rate for processing at 295° C. for 5 min. was no better.

Example E, F & Comparative Sample C, D

These examples were evaluated to determined the amount of colorant required to obtain similar b* color levels for fully formulated polyester polymer compositions catalyzed using titanium and antimony. Also, the effect of colorant amount on L* color, reaction time to reach similar It.V. levels, residual AA in the solid polyester particles, as well as, AA generation rate upon melting were evaluated.

In Examples E & F, blue and red organic toners were added to target a disc b* color target of about 2 CIELAB units. A small amount (0.0005 g) of black iron oxide from Ferro, was added to increase the reheat rate of the Ti-catalyzed polymer to match the reheat rate of the Sb-catalyzed polymer.

In Examples E & F, phosphorus catalyst deactivators were added to polyester polymers catalyzed with low levels of titanium (5 ppm) at relatively low temperatures (270° C.). When terminating a polymer run at a torque equivalent to approximately 0.80 IhV, the reaction time was about 155 min. The P/Ti mole ratio was at least one. After the 155 minutes of polymerization time, the vacuum was broken, the phosphorus compound was added, and vacuum was resumed to enhance mixing.

In these examples, the phosphorus compound was either phosphoric acid or an oligomeric phosphate triester. To avoid a potential loss in It.V., a concentrated form of the phosphorus compound was used. By using a concentrated form of the phosphorus compound, the amount of solvent present which could hydrolyze or glycolyze the polymer was reduced. Phosphoric acid was added as an 85 weight % solution in water. The smallest amount of phosphoric acid that can be reproducibly added by volume via syringe to the polymer was 0.02 mL, which corresponds to a target of about 80 ppm P in the polymer. Oligomeric phosphate trimesters were added directly as a 9 wt./wt. % phosphorus. The smallest amount of the oligomeric phosphate triesters that could be reproducibly added by volume via syringe to the polymer was 0.02 mL, which corresponds to a target of about 20 ppm P in the polymer.

The array in Table 7 sets forth the processing conditions for making the titanium catalyzed polymers using about 5 ppm Ti and using the oligomer mixture starting materials and amounts described as in Example 1, except that the oligomeric mixture contained about 1.5 DEG, and the degree of conversion, with some variance among batches, ranged from about 90% to 95%. The phosphorus compounds were added at stage 12. Two polymer runs were made per the following array, one for the addition of phosphoric acid, and one for the addition of oligomeric phosphate triesters.

TABLE 7

| Stage | Time minutes | Temp C.° | Vacuum torr | Stir Speed rpm |
|---|---|---|---|---|
| 1 | 0.1 | 270 | 730 | 0 |
| 2 | 10 | 270 | 730 | 150* |
| 3 | 2 | 270 | 140* | 300* |
| 4 | 1 | 270 | 140 | 300 |
| 5 | 10 | 270 | 51* | 300 |
| 6 | 5 | 270 | 51 | 300 |
| 7 | 1 | 270 | 4.5* | 300 |
| 8 | 20 | 270 | 4.5 | 300 |
| 9 | 2 | 270 | 0.8* | 30* |
| 10 | 155 | 270 | 0.8 | 30 |
| 11 | 3 | 270 | 650* | 30 |
| 12 | 2 | 270 | 650 | 30 |
| 13 | 1 | 270 | 0.5* | 45* |
| 14 | 5 | 270 | 0.5 | 45 |

*= ramp

Typical conditions for polymerizations catalyzed by antimony compounds were at about 285° C. and about 250 ppm Sb in the polymer. When terminating a polymer run at a torque equivalent to approximately 0.80 IhV, the reaction time was about 58 minutes. The array in Table 1 was used for runs catalyzed by about 250 ppm Sb. In Comparative Examples C & D, blue and red organic toners were added to target a disc b* color target of about 2 CIELAB units. The phosphorus compound(s) was added in stage 12. Two polymer runs were conducted per the following array, one for the addition of phosphoric acid, and one for the addition of oligomeric phosphate tri-esters.

Table 8 sets forth analytical results comparing the titanium catalyzed and the antimony catalyzed polymers stabilized with an oligomeric phosphate tri-ester. A lower amount P for the same Ti level, that is, a lower P:Ti mole ratio, may be as effective to a certain point. For example, in Example E, the P:Ti mole ratio using the XRF values was about 4.5. Comparable results are expected at P:Ti of 1; however, it was difficult to add the very small amount of oligomeric phosphate triesters needed to do achieve P:Ti mole ratio of 1 on the lab scale, especially as the Ti level was lowered to 5 ppm, as in these examples. Blue and red organic toners were added to target a disc b* color target of about 2 CIELAB units. The reheat rates of the Ti-catalyzed polymer matched that of the Sb-catalyzed polymer within test error; therefore no black iron oxide was added.

the XRF values was about 25. Comparable results are expected at P:Ti of 1; however, it was difficult to add the very small amount of phosphoric acid needed to do achieve P:Ti mole ratio of 1 on the lab scale, especially as phosphoric acid is more concentrated in phosphorus than the oligomeric phosphate triesters, and as the Ti level is lowered to 5 ppm, as in these examples.

TABLE 8

| | Catalyst | Temp (deg C.) | Finisher Time (min) | XRF Sb (ppm) | XRF Ti (ppm) | XRF P (ppm) | P:Ti Mole Ratio | IhV (dL/g) | AAFN ppm | AA Gen 295/5 (ppm) |
|---|---|---|---|---|---|---|---|---|---|---|
| Example E | Ti | 270 | 155 | — | 5 | 15 | 4.6 | 0.808 | 2.9 | 5.3 |
| Comparative C | Sb | 285 | 58 | 248 | 0 | 18 | | 0.831 | 20.95 | 22.19 |

| Catalyst | Red Toner ppm | Blue Toner ppm | P ppm | ItV dL/g | 3 disc L* | 3 disc a* | 3 disc b* | RHI (Ref. 9921W) | Powder L* | Powder a* | Powder b* | % Crystalinity |
|---|---|---|---|---|---|---|---|---|---|---|---|---|
| Ti | 8.69 | 17.39 | 15 | 0.855 | 75.68 | 0.03 | 0.92 | 0.97 | 73.69 | −0.69 | −4 | 39.3 |
| Sb | 6.69 | 13.38 | 18 | 0.881 | 77.27 | 1.19 | 2.54 | 0.967 | 75.91 | 0.12 | −2.62 | 38.5 |

The amount of AA generated upon melting for Example E (5 ppm Ti at 270° C. with 15 ppm P added late from an

TABLE 9

| | Catalyst | Temp (deg C.) | Finisher Time (min) | XRF Sb (ppm) | XRF Ti (ppm) | XRF P (ppm) | P:Ti Mole Ratio | IhV (dLg) | AAFN ppm | AA Gen 295/5 (ppm) |
|---|---|---|---|---|---|---|---|---|---|---|
| Example F | Ti | 270 | 155 | 2 | 5 | 81 | 25.04 | 0.767 | 7.86 | 9.22 |
| Comparative D | Sb | 285 | 58 | 248 | — | 87 | | 0.802 | 14.51 | 11.54 |

| | Catalyst | Red Toner (ppm) | Blue Toner (ppm) | P ppm | ItV dL/g | 3 disc L* | 3 disc a* | 3 disc b* | RHI (Ref. 9921W) | Powder L* Color | Powder a* Color | Powder b* Color | % Crystalinity |
|---|---|---|---|---|---|---|---|---|---|---|---|---|---|
| Example F | Ti | 7.6 | 15.2 | 81 | 0.809 | 75.47 | −0.99 | 1.80 | 0.99 | 74.86 | −1.35 | −2.84 | 38.1 |
| Comparative D | Sb | 6.29 | 12.58 | 87 | 0.848 | 73.81 | 0.59 | 2.97 | 0.987 | 74.3 | −0.41 | −2.9 | 34.7 | oligomeric phosphate triester) was very low (around 5 ppm) and certainly much lower than that generated for Comparative Example C (around 22 ppm). The amount of AA generated for Example E was lower than for Example A, even though the polycondensation temperature was 270° C. in both cases. Example E has about half the Ti present in Example A. Since the titanium level is lower and the phosphorus level is somewhat higher in Example E, the P:Ti mole ratio was higher in Example E than in Example A.

While Example E was somewhat darker (chip L*, a.k.a. 3 disc L*) than Comparative Example C, Example E was also bluer than the Chip b* target of 2 while Comparative Example C was closer to the target; therefore, less blue toner would have been needed to match Comparative Example C, hence, Example E would have been brighter. On the other hand, Comparative Example C was redder than Example E; therefore, less red toner would have been needed to get a neutral Chip a*, like Example E, hence, Comparative Example C would have been brighter.

Table 9 sets forth analytical results comparing the titanium catalyzed and the antimony catalyzed polymers stabilized with phosphoric acid. A lower amount P for the same Ti level, that is, a lower P:Ti mole ratio, may be as effective to a certain point. For example, in Example F, the P:Ti mole ratio using Example F was brighter (higher Chip or 3 disc L*) and bluer (lower Chip or 3 disc b*) than Comparative Example D. The amount of AA generated for Example F was higher than that generated for Example E. This could be due to the phosphorus source and/or the much higher P:Ti mole ratio in Example F.

The amount of AA generated for Comparative Example D was lower than that generated for Comparative Examples A & C. This could be due to the different phosphorus source and higher level phosphorus level in Comparative Example D.

Examples G, H, I, J & Comparative Examples E, F, G

Catalyst deactivators can be added after manufacturing the solid polyester particles, for example, during extrusion. Melt blending previously-made polymer and catalyst deactivators in a glass flask achieves a fairly uniform distribution of the deactivator within the polymer, somewhat like that which occurs during compounding extrusion or during extrusion in general. These examples use the melt-blending procedure outlined in Table 10, and utilized 100 g of PET modified with about 2.6 mole % isophthalic acid and about 4.2 mole % diethylene glycol. This PET was produced on a production scale line with about 10 ppm Ti and 0 ppm P (none added). Pellets were cryogenically ground through a 2 mm screen to facilitate mixing in a glass flask with a paddle stirrer. The resulting ground materials or powders are dried at 120° C. under full vacuum (25-30 in. Hg) overnight (about 16 hours) in a vacuum oven. After cooling the flask to about room temperature in a desiccator (about 1.5 hours), the catalyst deactivator is weighed into the flask.

A polymer head with stirrer was attached and the flask purged twice with nitrogen. The CAMILE™ automation system is programmed for the following array, as set forth in Table 10.

TABLE 10

| Stage | Time Min. | Temp. ° C. | Vac Torr | Stir RPM | Power kg-cm | Estimated End Time |
|---|---|---|---|---|---|---|
| 1 | .1 | 270 | 730 | 0 | 0 | 10:23:59 |
| 2 | 5 | 270 | 730 | 0 | 0 | 10:28:59 |
| 3 | 5 | 270 | 730 | 0 | 0 | 10:33:59 |
| 4 | 5 | 270 | 730 | 15* | 0 | 10:38:59 |
| 5 | 4 | 270 | 730 | 35* | 0 | 10:42:59 |
| 6 | 2 | 270 | 730 | 75* | 0 | 10:44:59 |
| 7 | 5 | 270 | 730 | 75 | 0 | 10:49:59 |

*= ramp

A moderate nitrogen purge was employed at all times. During Stages 2 and 3, the stirrer was turned slowly by hand. Following the end of the array, the polymer is separated from the glass flask, cooled, chopped, and cryogenically ground to pass a 3 mm screen. The ground polymer is analyzed for acetaldehyde generation rate, inherent viscosity, L*, a*, and b* color.

A lower amount P for the same Ti level, that is, a lower P:Ti mole ratio, may be as effective to a certain point. For example, in Examples G, H, I & J, the P:Ti mole ratio using the XRF values was about 8 to 9. Comparable results are expected at P:Ti of 1; however, it was difficult to add the very small amount of phosphorus compound needed to do achieve P:Ti mole ratio of 1 on the lab scale, especially given the concentrated phosphorus sources used in this example.

catalyst deactivator was added. There is also an improvement in the polyester color upon addition of the catalyst deactivator, particularly, in terms of less yellow color or lower b*. A variety of catalyst deactivators were used in Table 11, including phosphoric acid (H3PO4), polyphosphoric acid (PPA), and phosphorous acid (H3PO3).

Melt blending catalyst deactivators into previously isolated polymer was an effective means of lowering AA generation. Part or all of the catalyst deactivator may be added after the solid polyester particles are obtained from an exclusively melt-phase manufacturing process. Optionally, part or all of the catalyst deactivator may be added after the solid polyester particles are obtained from a conventional manufacturing process (includes solid-stating). Options for adding the catalyst deactivator after the manufacturing process for solid polyester particles include compounding extrusion to make concentrate particles, which may be blended with the bulk of the particles prior to subsequent extrusion or melt processing, and/or adding catalyst deactivator to the extruder or the melt processing equipment which is part of making a product, including a fiber, a sheet, a film, a film, a tray, a tube, or a bottle preform, which is made using an extruder in an injection molding process. The catalyst deactivator may be added to the extruder neat or in a liquid carrier.

Example K & Comparative Example H

These examples use the same starting polymer and procedures as described in Examples G, H, I, J & Comparative Examples E, F, G. The melt blending array used is that shown in Table 10. Following the end of the array or lab preparation, the polymer was cooled for about 15 min., separated from the glass flask, cooled for about 10 min. and then placed immediately into liquid nitrogen. The polymer was ground cryogenically to pass a 3 mm screen. The residual or free AA sample was kept frozen until its measurement by headspace GC per ASTM # F2013-00.

A lower amount P for the same Ti level, that is, a lower P:Ti mole ratio, may be as effective to a certain point. For example, in Example K, the P:Ti mole ratio using the XRF value was

TABLE 11

| Example | Additive | XRF Ti (ppm) | XRF P (ppm) | P:Ti Mole Ratio | IhV (dL/g) | AA GEN 295/5 (ppm) | % Reduction in AA GEN | Powder L* | Powder a* | Powder b* |
|---|---|---|---|---|---|---|---|---|---|---|
| Comp. E | None | 10 | 0 | 0 | 0.797 | 36.285 | −1.7 | 76.49 | −3.18 | 7.82 |
| Comp. F | None | 13 | 5 | 0.59 | 0.752 | 33.94 | 4.9 | 75.01 | −3.07 | 7.71 |
| Comp. G | None | 10 | 2 | 0.31 | 0.842 | 36.82 | −3.2 | 75.95 | −3.19 | 8.26 |
| G | H3PO4 | 11 | 63 | 8.85 | 0.765 | 17.175 | 51.9 | 75.12 | −3.07 | 6.89 |
| H | PPA | 12 | 68 | 8.76 | 0.737 | 17.86 | 49.9 | 76.64 | −3.19 | 6.36 |
| I | H3PO3 | 11 | 64 | 8.99 | 0.731 | 17.315 | 51.5 | 75.33 | −3.16 | 5.98 |
| J | H3PO3 | 10 | 52 | 8.04 | 0.827 | 17.15 | 51.9 | 75.65 | −3.25 | 6.27 |

With about 10 ppm Ti in the polymer and about 50 to 70 ppm of P (P:Ti mole ratio of 8 to 9) added via a catalyst deactivator, Table 11 results indicate about a 50% reduction in the amount of AA generated in a Tinius Olsen extrusion plastometer at 295° C. for 5 min, relative to the cases where no about 10. Comparable results are expected at P:Ti of 1; however, it was difficult to add the very small amount of phosphorous acid needed to do achieve P:Ti mole ratio of 1 on the lab scale, especially given the concentrated phosphorus source used in this example.

TABLE 12

| Example | Additive | XRF Ti (ppm) | XRF P (ppm) | P:Ti Mole Ratio | IhV (dl/g) | AA FN (ppm) | AAGEN 295/5 (ppm) | AVG L* | AVG a* | AVG b* |
|---|---|---|---|---|---|---|---|---|---|---|
| K | H3PO3 | 10 | 65 | 10.05 | 0.7 | 3.89 | 18.04 | 75.8 | −2.31 | 5.76 |
| Comp. H | none | 10 | 1 | — | 0.744 | 17.21 | 35.32 | 76.86 | −1.99 | 7.21 |
| CB-12 | — | — | — | — | — | 1.79 | 24.32 | — | — | — |
| CB-12 | — | — | — | — | — | — | 22.62 | — | — | — |

Per Table 12, melt blending a catalyst deactivator into previously isolated Ti-catalyzed PET, made without any phosphorus compound added, results in a large drop in residual or free AA in the solid polyester particles, as well as a drop in AA generation rate like that seen for Examples G, H, I & J.

I claim:

1. A method for the production of solid polyester polymer particles comprising:
   a) polycondensing a molten polyester polymer composition in the presence of a polycondensation catalyst composition comprising titanium species;
   b) adding a catalyst deactivator compound to the molten polyester polymer composition;
   c) after reaching an It.V. of about 0.69 dL/g or more, solidifying the molten polyester polymer composition into solid polyester polymer particles which do not contain added acetaldehyde scavengers; and
   d) reducing the amount of residual acetaldehyde in the solid particles to a level of about 10 ppm or less in the solid state without increasing the It.V. of the particles by more than about 0.03 dL/g in the solid state to form solid polyester polymer particles comprising from 5 to 10 ppm titanium and from 12 to 25 ppm phosphorus;
   wherein the catalyst deactivator compound is added to the molten polyester polymer composition in step b) at one or more of the following points:
   (i) within a final reactor for polycondensing the molten polyester polymer or between said final reactor and before a cutter for cutting the molten polyester polymer composition into said solid particles; or
   (ii) after the It.V. of the molten polyester polymer composition has risen to at least 0.5 dL/g; or
   (iii) vacuum applied to the molten polyester polymer melt, if any, is at least partially released; or
   (iv) following at least 75% of the polycondensation time; or (v) within ±0.10 dL/g, of the It.V. obtained upon solidification; or
   (vi) within 30 minutes before solidifying the melt, wherein the polycondensing is carried out in the absence of antimony.

2. The method of claim 1, wherein the catalyst deactivator and polycondensation catalyst are present in a P:Ti ratio of at least 1.2:1.

3. The method of claim 2, wherein the catalyst deactivator is at least one member selected from the group consisting of a phosphoric acid, a phosphorous acid, a pyrophosphoric acid and a polyphosphoric acid.

4. The method of claim 2, wherein solid polyester polymer particles comprising from 12 to 18 ppm phosphorus.

* * * * *